(12) United States Patent
Bae

(10) Patent No.: US 11,653,275 B2
(45) Date of Patent: May 16, 2023

(54) MECHANISM FOR SWITCHING A TRANSMISSION CHAIN ACROSS CARRIERS

(71) Applicant: Samsung Electronics Co., Ltd., Suwon-si (KR)

(72) Inventor: Jung Hyun Bae, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 17/160,311

(22) Filed: Jan. 27, 2021

(65) Prior Publication Data

US 2021/0306916 A1    Sep. 30, 2021

Related U.S. Application Data

(60) Provisional application No. 62/994,428, filed on Mar. 25, 2020.

(51) Int. Cl.
| | |
|---|---|
| *H04W 36/00* | (2009.01) |
| *H04W 36/10* | (2009.01) |
| *H04W 36/14* | (2009.01) |
| *H04W 52/14* | (2009.01) |
| *H04B 7/06* | (2006.01) |

(52) U.S. Cl.
CPC ...... *H04W 36/0069* (2018.08); *H04B 7/0602* (2013.01); *H04W 36/10* (2013.01); *H04W 36/14* (2013.01); *H04W 52/146* (2013.01)

(58) Field of Classification Search
CPC . H04W 36/0069; H04W 36/10; H04W 36/14; H04W 52/146; H04W 36/0033; H04B 7/0602; H04B 7/0404; H04B 7/0413; H04B 7/0426; H04B 7/0456; H04B 7/0608; H04L 5/0032; H04L 5/0023; H04L 5/0098; H04L 5/001
See application file for complete search history.

(56) References Cited

U.S. PATENT DOCUMENTS

| | | |
|---|---|---|
| 8,634,391 B2 | 1/2014 | Kim et al. |
| 9,917,682 B2 | 3/2018 | Zhang et al. |
| 10,693,610 B2 * | 6/2020 | Liu ........................ H04L 5/0098 |

(Continued)

FOREIGN PATENT DOCUMENTS

| | | | | |
|---|---|---|---|---|
| JP | 6866504 B2 * | 4/2021 | ........... | H04B 7/0426 |
| WO | WO-2021162620 A1 * | 8/2021 | | |

OTHER PUBLICATIONS

"On switching period between two FR1 uplink carriers", China Telecom, Sep. 2019, 3GPP TSG RAN Meeting #85, RP-191894, Newport Beach, USA, Sep. 16-20, 2019, Agenda: 9.4.19, 6 pages.

(Continued)

*Primary Examiner* — Ahmed Elallam
(74) *Attorney, Agent, or Firm* — Lewis Roca Rothgerber Christie LLP

(57) ABSTRACT

Provided is a method of switching, by a user equipment (UE), a transmission chain across carriers, the method including determining to switch a first transmission chain for a transmission between a first carrier and a second carrier, determining a length of a switching gap during which no transmission or reception occurs on the first carrier and/or the second carrier, locating the switching gap within a switching duration, and switching the first transmission chain between the first carrier and the second carrier during the switching gap.

20 Claims, 14 Drawing Sheets

(56) References Cited

U.S. PATENT DOCUMENTS

2010/0246454 A1 9/2010 Ansari et al.
2016/0028533 A1 1/2016 Kazmi et al.
2019/0028940 A1 1/2019 Wu

OTHER PUBLICATIONS

"3rd Generation Partnership Project; Technical Specification Group Radio Access Network;NR; Physical layer procedures for data (Release 16)", 3GPP TS 38.214 V16.2.0 (Jun. 2020), 164 pages.
"3rd Generation Partnership Project; Technical Specification Group Radio Access Network; NR; Physical layer procedures for control (Release 16)", 3GPP TS 38.213 V16.2.0 (Jun. 2020), 176 pages.

* cited by examiner

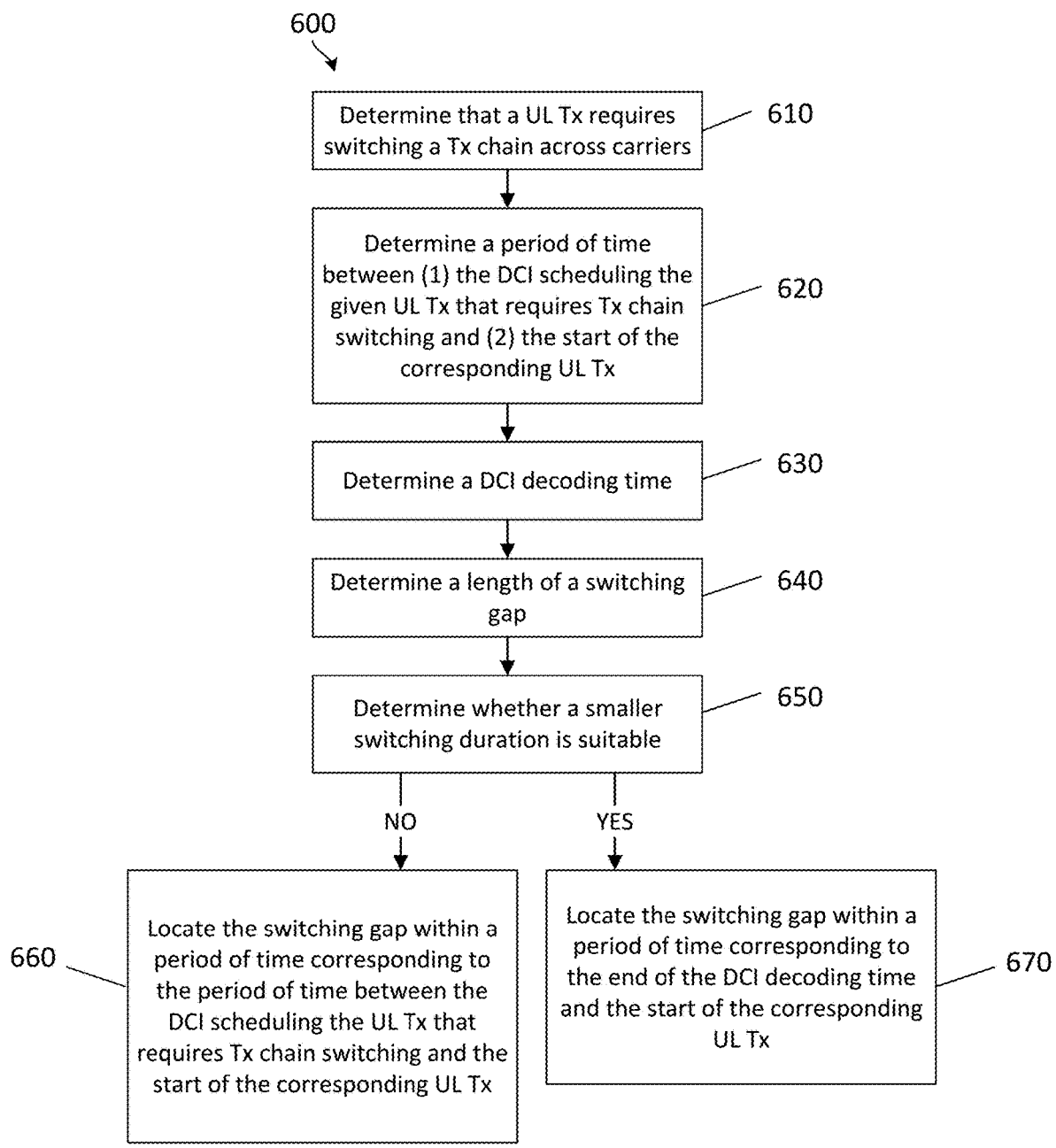

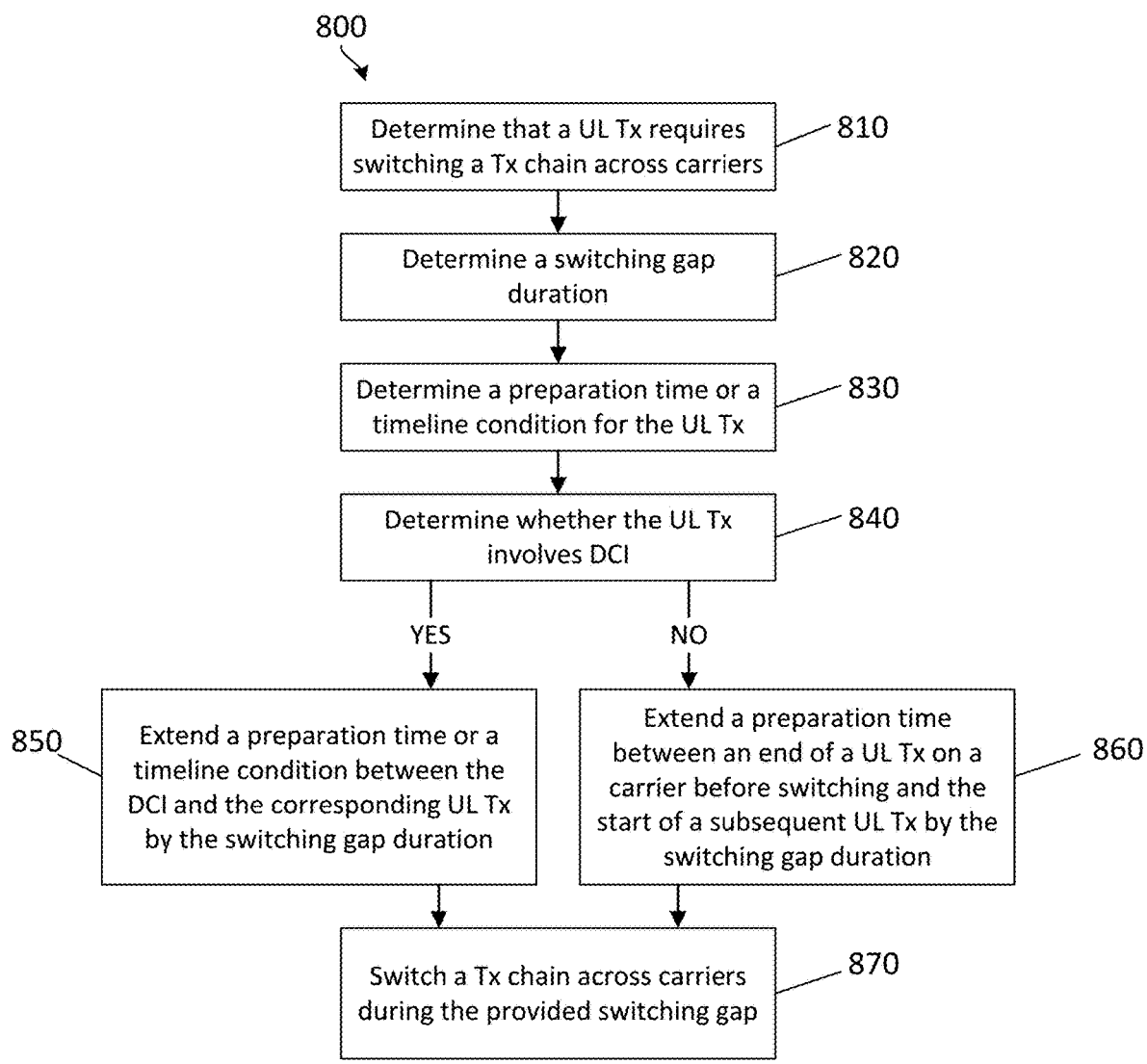

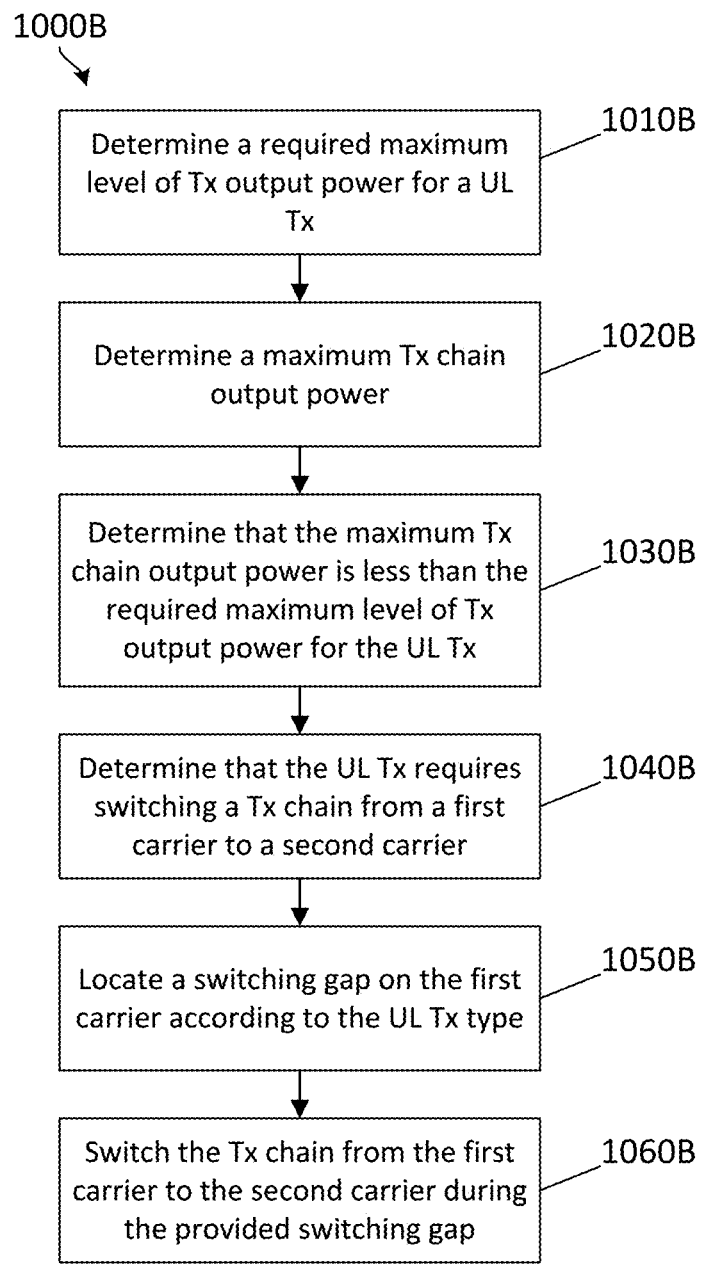

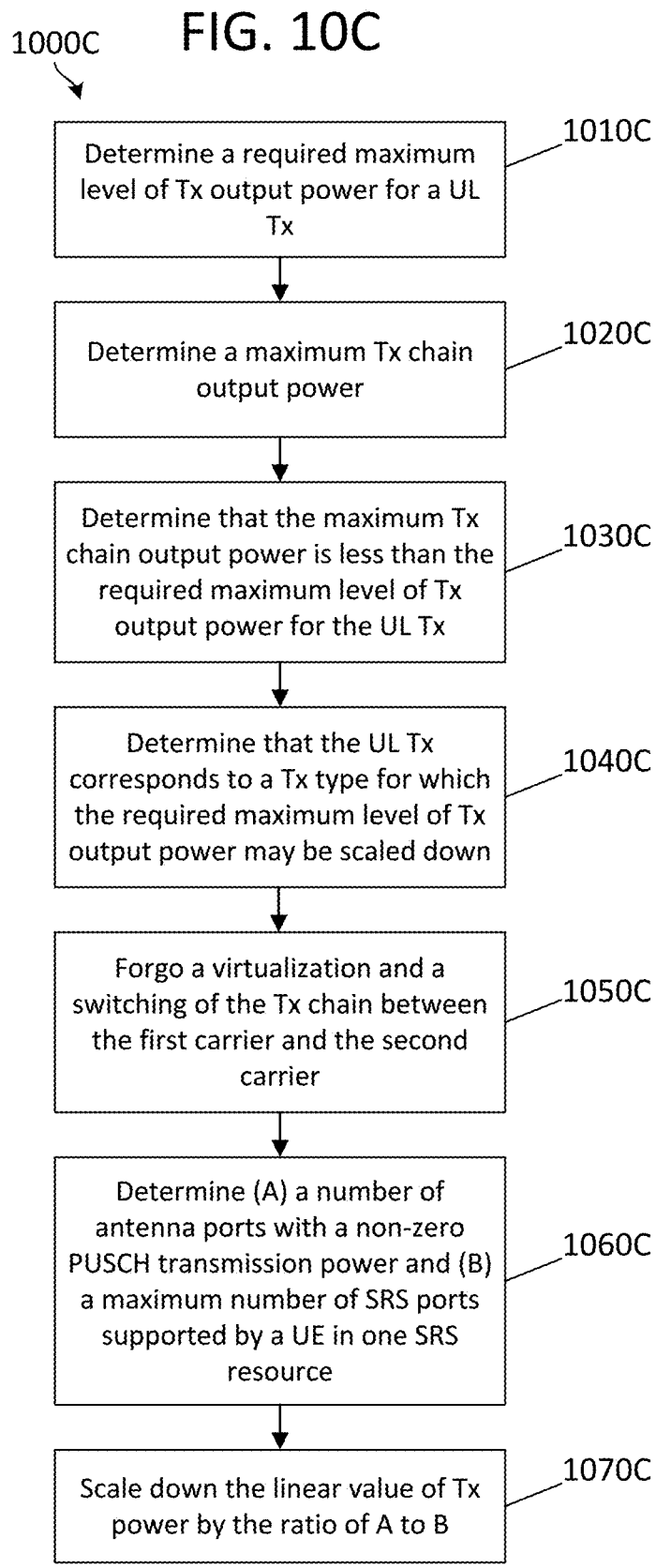

MECHANISM FOR SWITCHING A TRANSMISSION CHAIN ACROSS CARRIERS

CROSS-REFERENCE TO RELATED APPLICATION(S)

The present application claims priority to, and the benefit of, U.S. Provisional Application Ser. No. 62/994,428, filed Mar. 25, 2020, entitled "DESIGN OF TX ANTENNA SWITCHING MECHANISM ACROSS CARRIERS," the entire content of which is incorporated herein by reference.

FIELD

Aspects of some embodiments of the present disclosure relate to a method, apparatus, and system for switching transmission channels across carriers for wireless communications.

BACKGROUND

In the field of wireless communications, there are various transmission schemes involving the use of multiple transmission (Tx) chains in a user equipment (UE) (e.g., to improve performance). Schemes for multiple-input multiple-output (MIMO) transmission from a user equipment (UE), which use multiple transmission chains and antennas on one carrier, may provide improved performance over traditional single transmit (or transmission) antenna schemes (e.g., single-input single-output (SISO) schemes). MIMO schemes may improve a user experience through increased capacity and higher data rates by allowing for multiple antenna uplink (UL) transmissions on one carrier.

Further, virtualization schemes, in which multiple actual Tx chains are combined to realize (e.g., simulate) one port, may improve performance by allowing a UE to flexibly meet different output power levels.

Additionally, multi-carrier transmission schemes, which may include carrier aggregation (CA), dual connectivity (DC) (including multi-radio (MR) DC such as E-UTRA/NR (EN) DC), supplementary uplink (SUL), and which are described in 3rd Generation Partnership Project (3GPP) specifications, also provide various benefits, such as higher transmission rates and larger coverage by allowing separate transmissions on different carriers by one UE. Moreover, many commercial UEs support these multi-carrier schemes.

SUMMARY

Aspects of embodiments of the present disclosure relate to wireless communications, and provide improvements to transmission chain/antenna carrier switching in communication systems involving multiple Tx chain schemes, such as multi-input multi-output (MIMO), virtualization, and multi-carrier transmission.

According to some embodiments of the present disclosure, there is provided a method of switching, by a user equipment (UE), a transmission chain across carriers, the method including determining to switch a first transmission chain for a transmission between a first carrier and a second carrier, determining a length of a switching gap during which no transmission or reception occurs on the first carrier and/or the second carrier, locating the switching gap within a switching duration, and switching the first transmission chain between the first carrier and the second carrier during the switching gap.

The switching duration may correspond to an extended preparation time for switching the first transmission chain between the first carrier and the second carrier based on a transmission type of the transmission, and the method may further include determining a preparation time or a timeline condition corresponding to the transmission type of the transmission including a sounding reference signal (SRS) transmission or an uplink control information (UCI) multiplexing on a physical uplink shared channel (PUSCH), determining the extended preparation time to be equal to or greater than the preparation time plus the length of the switching gap, or to be equal to or greater than the timeline condition plus the length of the switching gap, and switching the first transmission chain within the extended preparation time.

The determining to switch the first transmission chain may include determining that a present switching configuration corresponds to a first case wherein the first transmission chain is located in the first carrier and a second transmission chain is located in the second carrier, and determining to use both the first transmission chain and the second transmission chain in the second carrier, or determining that the present switching configuration corresponds to a second case wherein both the first transmission chain and the second transmission chain are located in the second carrier, and determining to use the first carrier.

The switching duration may correspond to a period of time between a downlink control information (DCI) scheduling of the transmission and a start of the transmission.

The switching duration may correspond to a period of time between an end of a downlink control information (DCI) decoding time corresponding to a DCI scheduling of the transmission and a start of the transmission.

The switching duration may correspond to a period of time between an end of a previous transmission and a start of the transmission.

The determining to use the first carrier may include determining to use a multi-carrier transmission.

The determining to use both the first transmission chain and the second transmission chain in the second carrier may include determining to use a multiple-input multiple-output (MIMO) transmission or virtualization.

The determining to switch the first transmission chain between the first carrier and the second carrier may further include determining to use a non-codebook based physical uplink shared channel (PUSCH) using more than one transmission chain in one carrier, and determining that the present switching configuration corresponds to the first case, or determining to use a non-codebook based PUSCH using only one transmission chain in one carrier, and determining that the present switching configuration corresponds to the second case.

The determining to switch the first transmission chain between the first carrier and the second carrier may further include determining that the transmission corresponds to a transmission type for which virtualization is applied only sometimes, determining that the present switching configuration corresponds to the first case, and forgoing both virtualization and switching from the first case to the second case.

The determining to switch the first transmission chain between the first carrier and the second carrier may further include determining a maximum level of transmission output power for the transmission, determining a maximum transmission chain output power of the first transmission chain or the second transmission chain, determining that the maximum transmission chain output power of either the first transmission chain or the second transmission chain is less than the maximum level of transmission output power for the transmission, determining that the transmission corresponds to a transmission type for which a linear value of the maximum level of transmission output power for the transmission is capable of being scaled down, determining that the present switching configuration corresponds to the first case, forgoing both virtualization and switching from the first case to the second case, and scaling down the linear value of the maximum level of transmission output power for the transmission, such that the first transmission chain and/or the second transmission chain are enabled to have the maximum level of transmission output power for the transmission without virtualization.

The determining to use virtualization may include determining that virtualization is applied for the transmission type.

The scaling down the linear value of the maximum level of transmission output power for the transmission may include determining a number of antenna ports with a non-zero PUSCH transmission power, determining a maximum number of SRS ports supported by a user equipment (UE) in one SRS resource, and scaling down the maximum level of transmission output power for the transmission by a ratio of the number of antenna ports with the non-zero PUSCH transmission power to the maximum number of SRS ports supported by the UE in one SRS resource.

According to other embodiments of the present disclosure, there is provided a user equipment (UE) for performing a method of switching a transmission chain across carriers, wherein the UE is configured to determine to switch a first transmission chain for a transmission between a first carrier and a second carrier, determine a length of a switching gap during which transmission and/or reception on the first carrier or the second carrier is interrupted, locate the switching gap on the first carrier or on the second carrier within a switching duration, and switch the first transmission chain between the first carrier and the second carrier during the switching gap.

The switching duration may correspond to an extended preparation time for switching the first transmission chain between the first carrier and the second carrier based on a transmission type of the transmission, and the UE may be configured to determine a preparation time or a timeline condition corresponding to the transmission type of the transmission including a sounding reference signal (SRS) transmission or an uplink control information (UCI) multiplexing on a physical uplink shared channel (PUSCH), determine the extended preparation time to be equal to or greater than the preparation time plus the length of the switching gap, or to be equal to or greater than the timeline condition plus the length of the switching gap, and switch the first transmission chain within the extended preparation time.

The UE may be configured to determine to switch the first transmission chain between the first carrier and the second carrier by determining that a present switching configuration corresponds to a first case wherein the first transmission chain is located in the first carrier and a second transmission chain is located in the second carrier, and determining to use both the first transmission chain and the second transmission chain in the second carrier, or determining that the present switching configuration corresponds to a second case wherein both the first transmission chain and the second transmission chain are located in the second carrier, and determining to use the first carrier.

The switching duration may correspond to a period of time between an end of a downlink control information (DCI) decoding time corresponding to a DCI scheduling of the transmission and a start of the transmission, or a period of time between an end of a previous transmission and a start of the transmission.

According to other embodiments of the present disclosure, there is provided a system for enabling a user equipment (UE) that is configured to switch a transmission chain across carriers to communicate within a network, the system including the UE, and a base station that is communicatively coupled with the UE, wherein the UE is configured to perform a method of switching a transmission chain across carriers, the method including determining to switch a first transmission chain for a transmission between a first carrier and a second carrier, determining a length of a switching gap during which no transmission or reception occurs on either the first carrier or the second carrier, locating the switching gap within a switching duration, and switching the first transmission chain between the first carrier and the second carrier during the switching gap.

The switching duration may correspond to an extended preparation time for switching the first transmission chain between the first carrier and the second carrier based on a transmission type of the transmission, and the method may further include determining a preparation time or a timeline condition corresponding to the transmission type of the transmission including a sounding reference signal (SRS) transmission or an uplink control information (UCI) multiplexing on a physical uplink shared channel (PUSCH), determining the extended preparation time to be equal to or greater than the preparation time plus the length of the switching gap, or to be equal to or greater than the timeline condition plus the length of the switching gap, and switching the first transmission chain within the extended preparation time.

The UE may be configured to determine to switch the first transmission chain between the first carrier and the second carrier by determining that a present switching configuration corresponds to a first case wherein the first transmission chain is located in the first carrier and a second transmission chain is located in the second carrier, and determining to use both the first transmission chain and the second transmission chain in the second carrier, or determining that the present switching configuration corresponds to a second case wherein both the first transmission chain and the second transmission chain are located in the second carrier, and determining to use the first carrier.

Accordingly, embodiments of the present disclosure provide improvements and advantages for antenna and Tx chain switching. For example, aspects of embodiments of the present disclosure provide mechanisms with which a UE may perform switching with reasonable implementation complexity (e.g., UE implementation complexity for antenna switching may be reduced). Furthermore, embodiments of the present disclosure provide methods that may reduce a network waste and/or power consumption by improving switching efficiencies.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 6 is a flowchart depicting a method of determining a location of a switching gap, according to some embodiments of the present disclosure;

FIG. 8 is a flowchart depicting a method of determining a location of a switching gap and an extended preparation time, according to some embodiments of the present disclosure;

FIGS. 10A, 10B, and 10C (collectively, FIG. 10) are flowcharts depicting methods of determining that switching a transmission chain across carriers to use two transmission chains in one carrier is suitable, according to some embodiments of the present disclosure.

Figure 1:
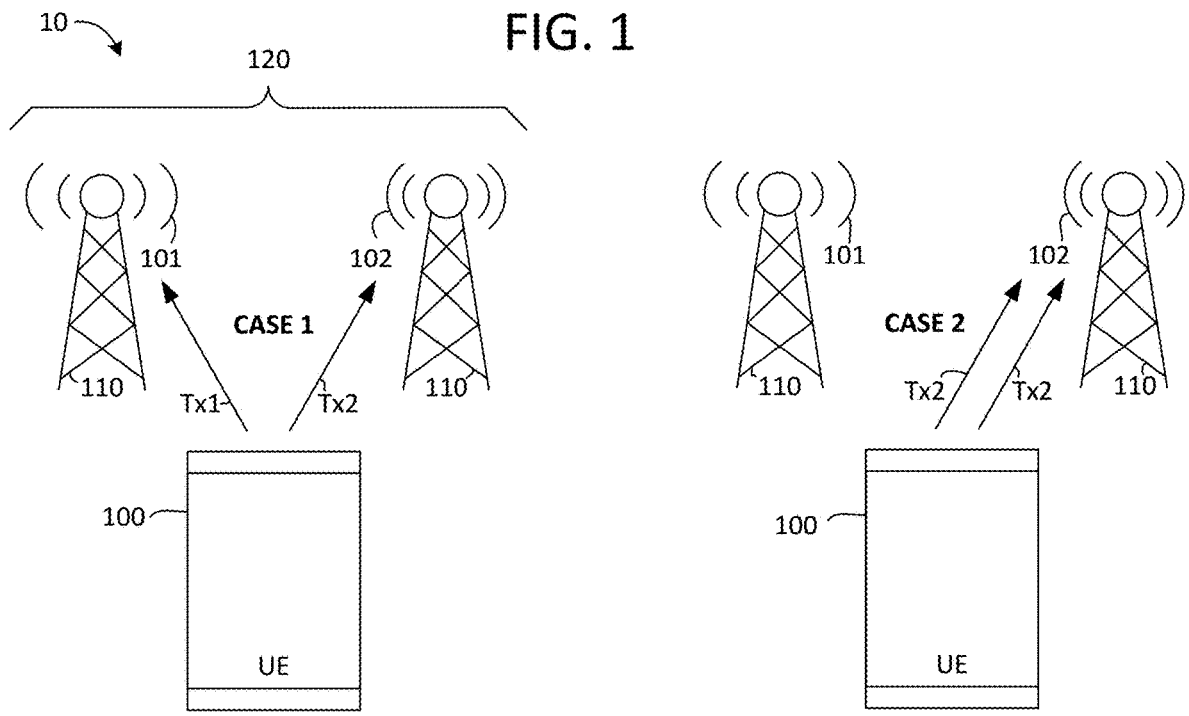
FIG. 1 is a system diagram illustrating two switching configurations (CASE 1 and CASE 2) of a UE, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of wireless communications, there are various transmission schemes involving the use of multiple Tx chains in a UE to improve performance. For example, as described in 3GPP document RP-191894, and as mentioned above, multiple-input multiple-output (MIMO) transmission from a user UE has various benefits over single transmit/transmission antennas. For example, MIMO schemes, which incorporate the use of multiple Tx chains and antennas on a single carrier (e.g., to allow a UE to multiplex multiple streams on the single carrier), may improve a user experience through increased capacity and/or higher data rates by allowing for multiple antenna UL transmissions on one carrier.

Further, virtualization schemes, in which multiple actual Tx chains are combined to simulate one port, may improve a UE performance by allowing the UE to flexibly meet various output power levels.

Additionally, there also are various benefits of schemes with multiple carriers. Such multi-carrier schemes (or modes) may include carrier aggregation (CA), dual connectivity (DC) (including multi-radio (MR) DC such as E-UTRA/NR (EN) DC), supplementary uplink (SUL), which are described in 3GPP specifications. For example, multi-carrier schemes may increase transmission rates and coverage by allowing for separate transmissions on different carriers with one UE. Moreover, many commercial UEs support these multi-carrier schemes.

To benefit from a variety of these schemes involving multiple Tx chains and antennas (e.g., MIMO, virtualization, and multi-carrier schemes), it may be suitable for a UE to be equipped with a greater number of antennas and UL Tx chains (e.g., more than two antennas and more than two Tx chains). However, many commercial UEs can only support up to two concurrent UL Tx chains. Thus, when such a UE supports two UL carriers, the only implementable option would be to dedicate one UL Tx chain for each carrier (e.g., a first UL Tx chain dedicated to a first carrier and a second UL Tx chain dedicated to a second carrier). Accordingly, the UE could not be configured to benefit from UL two Tx MIMO or virtualization, which use two UL Tx chains on one carrier.

Accordingly, aspects of some embodiments of the present disclosure provide a mechanism for allowing a UE to switch a Tx chain across carriers (e.g., from one carrier to another carrier) such that UL MIMO can operate in one of the carriers. Furthermore, aspects of some embodiments of the present disclosure provide antenna switching methods that may mitigate implementation complexity, reduce or minimize network waste (e.g., system waste) and/or reduce power consumption by, in part, improving switching efficiencies between various configurations (e.g., MIMO, virtualization, and multi-carrier configurations).

While some embodiments of the present disclosure are discussed and illustrated to depict a system including two carriers with two total Tx chains at a UE side, the present disclosure is not limited thereto. For example, some aspects of embodiments of the present disclosure may be used with an arbitrary number of carriers and Tx chains.

Figure 2:
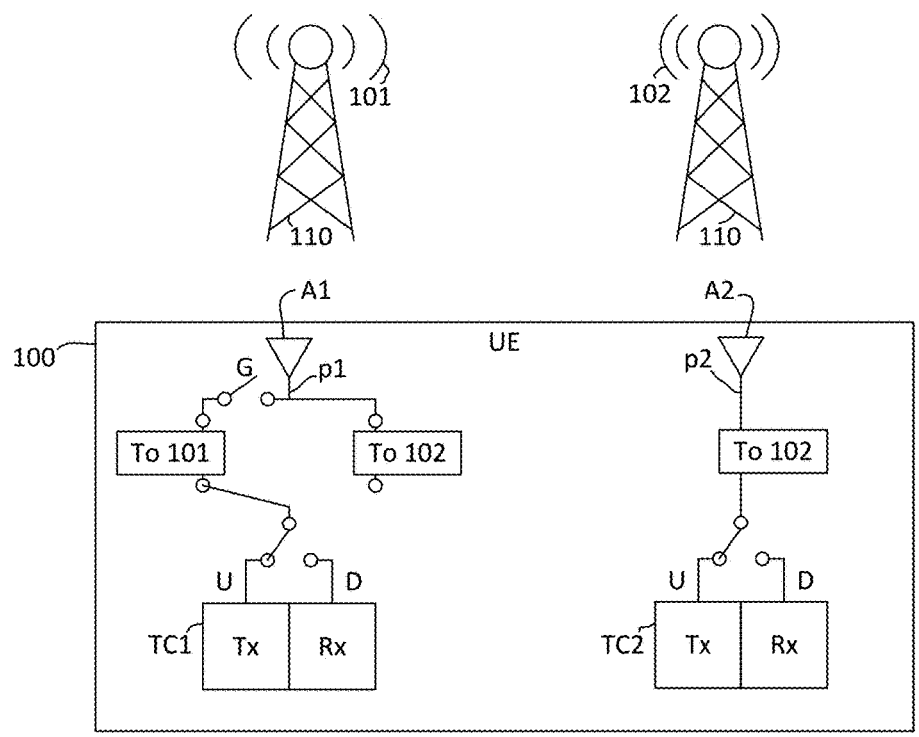
FIG. 2 is a simplified conceptual switching diagram depicting a UE switching scheme, according to some embodiments of the present disclosure.

FIG. 1 is a system diagram illustrating two switching configurations (CASE 1 and CASE 2) of a UE, according to some embodiments of the present disclosure, and FIG. 2 is a simplified conceptual switching diagram depicting a UE switching scheme, according to some embodiments of the present disclosure.

Referring to FIGS. 1 and 2, a wireless communication system 10 may include a UE 100 (e.g., mobile handset, wireless device, wireless modem, etc.) and one or more base stations 110 corresponding to a network 120 (or networks) and enabling communication between devices connected to the network 120 (e.g., the UE 100 may be enabled to communicate within the network 120). The wireless communication system 10 may include a first carrier 101 and a second carrier 102, which may correspond to different frequency bands.

The UE 100 may include a first transmission (Tx) chain TC1 corresponding to a first antenna A1 and to a first port p1. The first Tx chain TC1 may be able to switch between uplink (UL) transmission (e.g. U) on the first carrier 101 and UL transmission on the second carrier 102. The UE 100 may include a second Tx chain TC2 corresponding to a second antenna A2 and to a second port p2. The second Tx chain TC2 may be configured for UL transmission on at least the second carrier 102. The UE 100 may also include a receive (Rx) chain configured for downlink reception (e.g. D) on the first carrier 101 or the second carrier 102.

Figure 3:
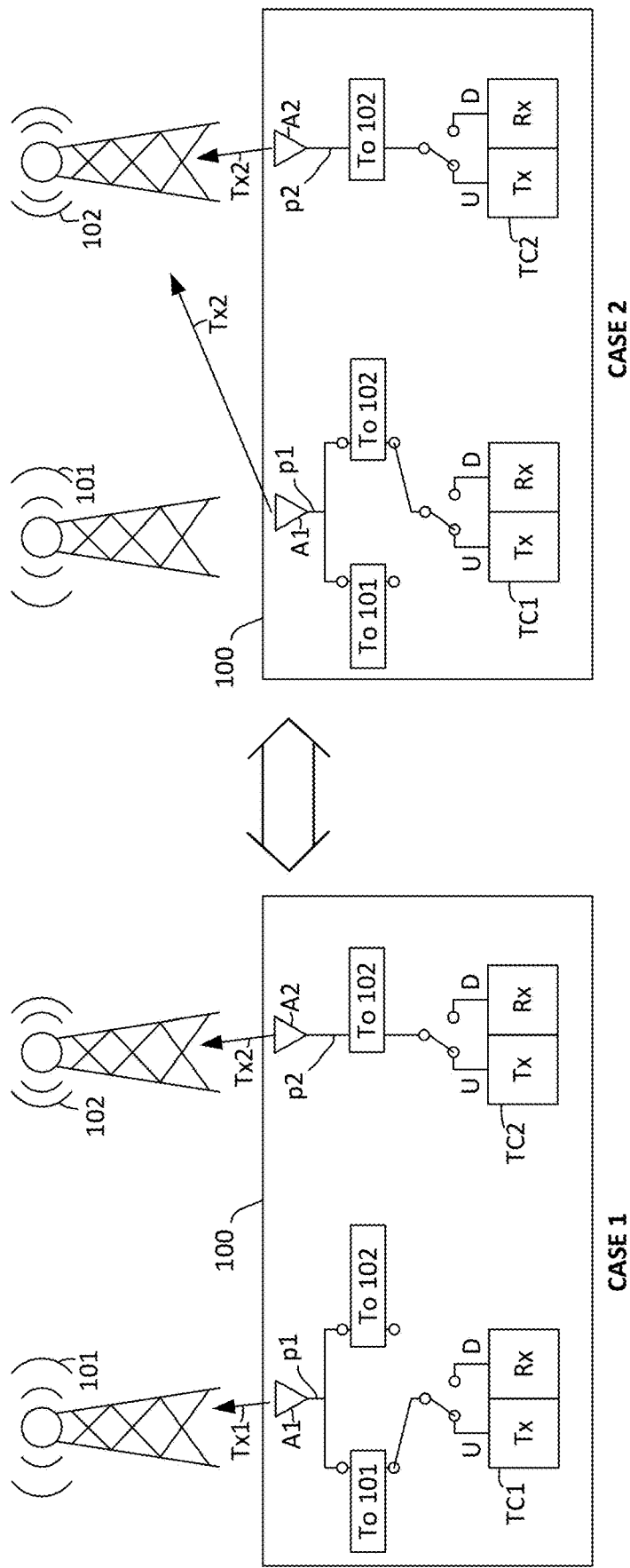
FIG. 3 is a simplified conceptual switching diagram depicting a UE switching between CASE 1 and CASE 2, according to some embodiments of the present disclosure.

FIG. 3 is a simplified conceptual switching diagram depicting a UE switching between CASE 1 and CASE 2, according to some embodiments of the present disclosure.

Referring to FIGS. 1-3, the two cases (CASE 1 and CASE 2), described in Table 1 (below) and depicted in FIG. 1, may refer to switching configurations for UL transmission from the UE 100 to the base station(s) 110 of the wireless communication system 10, where the UE 100 includes two carriers with two total Tx chains.

CASE 1 may correspond to a configuration where the first Tx chain TC1 of the UE 100 is coupled (e.g., communicatively coupled) to the first port p1 and to the first antenna A1 for first carrier transmission Tx1 (e.g., transmission on the first carrier 101), and where the second Tx chain TC2 of the UE 100 is coupled to the second port p2 and to the second antenna A2 for second carrier transmission Tx2 (e.g., transmission on the second carrier 102). CASE 1 may correspond to a multi-carrier scheme.

CASE 2 may correspond to a configuration where the first Tx chain TC1 is coupled to the first port p1 and to the first antenna A1 for second carrier transmission Tx2, and where the second Tx chain TC2 is coupled to the second port 2 and to the second antenna A2 for second carrier transmission Tx2. CASE 2 may correspond to a MIMO scheme or a virtualization scheme.

Moreover, in some embodiments, in CASE 1, UL transmission may happen on the first carrier 101 and/or the second carrier 102 (e.g., there may be two options for the handling of CASE 1, which respectively correspond to allowing or not allowing UL transmission on the second carrier 102). Meanwhile, in some embodiments, in CASE 2, transmission may happen only on the second carrier 102 (e.g., no first carrier transmission Tx1 may occur).

TABLE 1

| | |
|---|---|
| CASE 1 | 1 Tx on carrier 1 and 1 Tx on carrier 2 |
| CASE 2 | 0 Tx on carrier 1 and 2 Tx on carrier 2 |

As will be discussed further below, in addition to the UE 100 allowing for switching between CASE 1 and CASE 2 as different circumstances arise, some embodiments of the present disclosure may provide a switching gap G (or antenna switching gap). The switching gap G may be a duration of time (e.g., transient time) during which transmission and/or reception on one or more carriers may be interrupted (e.g., paused, stopped, or prevented). The switching gap G may facilitate the switching of the first Tx chain TC1 and the first antenna A1 across carriers.

As an example, FIG. 2 provides a simplified conceptualization of a switch for implementing a switching gap G, the switch being located between the first Tx chain TC1 and the first port p1. A switching gap G may be provided to allow for a settling time. For example, switching an antenna from one carrier to another may involve operations (e.g., additional operations) for which the settling time is suitable. For example, a local oscillator modification from one frequency to another may create disruption in a Tx chain, which may be suitably settled after the settling time. Furthermore, new gain values may be provided to accommodate a new frequency, which may also be accommodated by the settling time. Moreover, during the settling time, other Tx chains may be impacted and, thus, reliable transmission may be compromised until after the settling time. Accordingly, the duration of the switching gap G may be determined based on a length (e.g., a duration) that is suitable for accommodating the settling time.

Furthermore, a switching instance of the switching gap G (e.g., the temporal location of the switching gap G), along with a duration of the switching gap G, may be either explicitly regulated/configured by the network 120 or implicitly determined by the UE 100 based on a determination of when switching may be appropriate. For example, the UE 100 may implicitly determine whether switching is appropriate, and may implicitly determine an exact instance of switching to avoid switching inefficiencies.

In some embodiments, when no UL transmission is allowed on the second carrier 102 for CASE 1, the UE may determine the implicit differentiation between CASE 1 and CASE 2, as well as whether switching has occurred, by determining the existence of a transmission on the first carrier 101 or a transmission on the second carrier 102. For example, the UE 100 may analyze differences between CASE 1 and CASE 2 and may determine that switching is appropriate based on the existence of first carrier transmission Tx1 or second carrier transmission Tx2. For example, the UE 100 may determine that CASE 1 is implemented (or selected) when there is UL transmission on the first carrier 101, and may determine that CASE 2 is implemented (or selected) when there is UL transmission on the second carrier 202. Accordingly, and for example, when a first carrier transmission Tx1 is suitable or scheduled, the UE 100 may implicitly determine that the CASE 1 switching configuration is suitable, and contrastingly, when a second carrier transmission Tx2 is suitable, the UE 100 may implicitly determine that the CASE 2 switching configuration is suitable.

However, such an implicit switching determination scheme may lead to inefficiencies because the UE 100 may switch from CASE 1 to CASE 2 even when only one transmission chain (e.g., the second Tx chain TC2) is used on the second carrier 102 (e.g., the second Tx chain TC2 alone may be sufficient for a given second carrier transmission Tx2).

For example, when only one Tx chain (e.g., the second Tx chain TC2) is used on the second carrier 102 and is located by the UE 100, even when the UE 100 still locates another Tx chain (e.g., the first Tx chain TC1) in the first carrier 101, UL transmission on the second carrier 102 may still be supported. Thus, there might not be any benefit achieved by switching from CASE 1 to CASE 2. Accordingly, network waste may be introduced due to unnecessarily switching the first Tx chain TC1 and antenna A1 away from the first carrier 101. For example, the UE 100 may not be able to perform transmission or reception (Rx) on the first carrier 101 without switching back to CASE 1, and unnecessary switching uses up additional time during which transmission and/or reception would otherwise occur.

In some embodiments, when UL transmission is allowed on the second carrier 102 for CASE 1, differentiation between CASE 1 and CASE 2, as well as switching, may be known by the number of suitable Tx chains in the second carrier 102. For example, the UE 100 may determine that CASE 1 is implemented (or selected) when there is UL transmission on the second carrier 102 suitable for only one Tx chain, and the UE 100 may determine that CASE 2 is implemented (or selected) when there is UL transmission on the second carrier 102 suitable for two Tx chains. That is, the UE 100 may implicitly differentiate between CASE 1 and CASE 2, and may determine that switching is appropriate based on a number of suitable Tx chains in the second carrier 102. For example, when a given second carrier transmission Tx2 uses one Tx chain, the UE 100 may implicitly determine that CASE 1 switching configuration is suitable, and when a given second carrier transmission Tx2 seeks to use two Tx chains, the UE 100 may implicitly determine that CASE 2 switching configuration is suitable.

However, such an implicit switching determination scheme may lead to inefficiencies because the UE 100 may switch from CASE 2 to CASE 1 even when there is no UL transmission on the first carrier 101 (e.g., no first carrier transmission Tx1 may be scheduled, but a given second carrier transmission Tx2 may use only one Tx chain). Thus, when there is no UL transmission on the first carrier 101, the UE 100 still can locate both the first Tx chain TC1 and the second Tx chain TC2 in the second carrier 102, and there may be no benefit to switching from CASE 2 to CASE 1. Accordingly, network waste may be introduced due to inefficiently switching the first Tx chain TC1 and the first antenna A1 away from the second carrier 102. For example, the UE 100 may not be able to perform transmission in a given second carrier transmission Tx2 that uses two Tx chains without switching back to CASE 2.

Figure 4A:
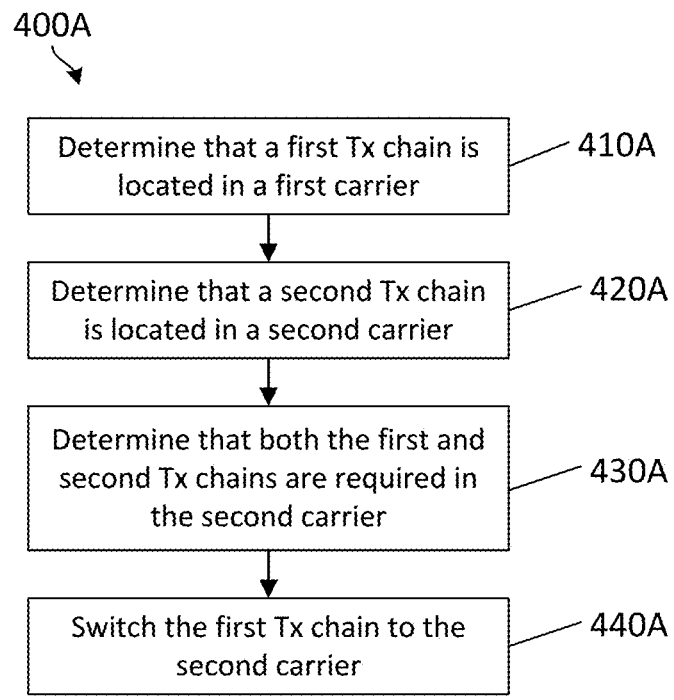
FIGS. 4A and 4B (collectively, FIG. 4) are flowcharts depicting methods of switching a transmission chain across carriers, according to some embodiments of the present disclosure.
Figure 4B:
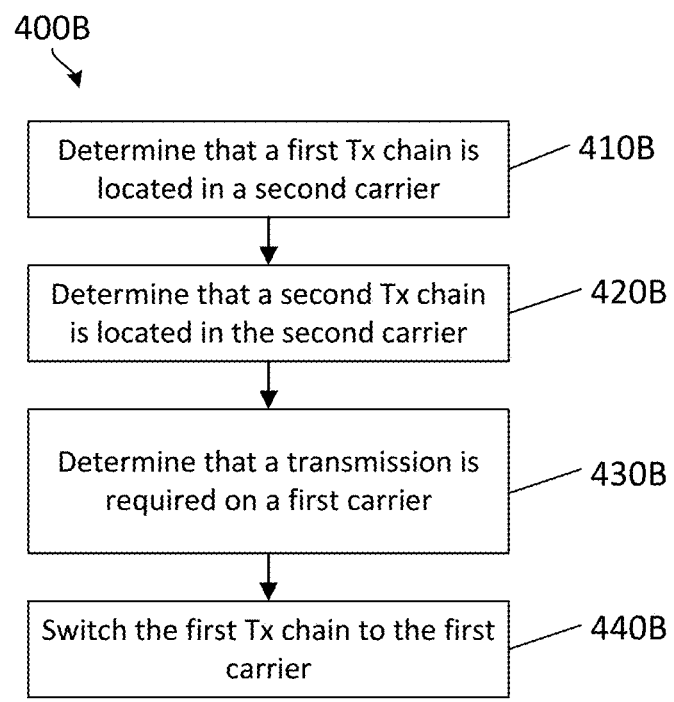

FIGS. 4A and 4B (collectively, FIG. 4) are flowcharts depicting methods of switching a transmission chain across carriers, according to some embodiments of the present disclosure.

Referring to FIGS. 3 and 4, in some embodiments of the present disclosure, to reduce inefficiencies, a mechanism is provided in which switching from CASE 1 to CASE 2 may happen based on a determination that two Tx chains are to be used on the second carrier 102, and in which switching from CASE 2 to CASE 1 may happen based on a determination that there is a UL transmission on the first carrier 101. For example, the UE 100 may implicitly determine that: (1) switching from CASE 1 to CASE 2 is appropriate based on two Tx chains being used on the second carrier 102; and (2) switching from CASE 2 to CASE 1 is appropriate based on the suitability of a first carrier transmission Tx1.

For example, and referring to FIG. 4A, a method 400A may be performed, wherein the UE 100 may determine (e.g., by using a processor and a memory) that the first Tx chain TC1 is located in the first carrier 101 (operation 410A), that the second Tx chain TC2 is located in the second carrier 102 (operation 420A), and that two Tx chains (e.g., both the first and second Tx chains TC1 and TC2) are suitable in the second carrier 102 (operation 430A). Based on the above determinations, the UE 100 may cause the first Tx chain TC1 to be located in (e.g. switched to, or relocated to) the second carrier 102 (e.g., switched from CASE 1 to CASE 2) (operation 440A). On the other hand, when the UE 100 determines that the first Tx chain TC1 is located in the first carrier 101, that the second Tx chain TC2 is located in the second carrier 102, and that only one Tx chain is suitable in the second carrier 102, then the UE 100 may maintain the existing locations of the first Tx chain TC1 and the second Tx chain TC2.

Referring to FIG. 4B, a method 400B may be performed, wherein the UE 100 may determine (e.g., by using a processor and a memory) that the first Tx chain TC1 is located in a second carrier 102 (operation 410B), that a second Tx chain TC2 is located in the second carrier 102 (operation 420B), and that transmission is suitable on the first carrier 101 (operation 430B). Based on the above determinations, the UE 100 may cause the first Tx chain TC1 to be located in (e.g., switched to, or relocated to) the first carrier 101 (e.g., switched from CASE 2 to CASE 1) (operation 440B). On the other hand, when the UE 100 determines that the first Tx chain TC1 is located in the second carrier 102, that the second Tx chain TC2 is located in the second carrier 102, and that transmission on only the second carrier 102 would be suitable, the UE 100 may maintain the existing locations of the first Tx chain TC1 and the second Tx chain TC2.

Figure 5A:
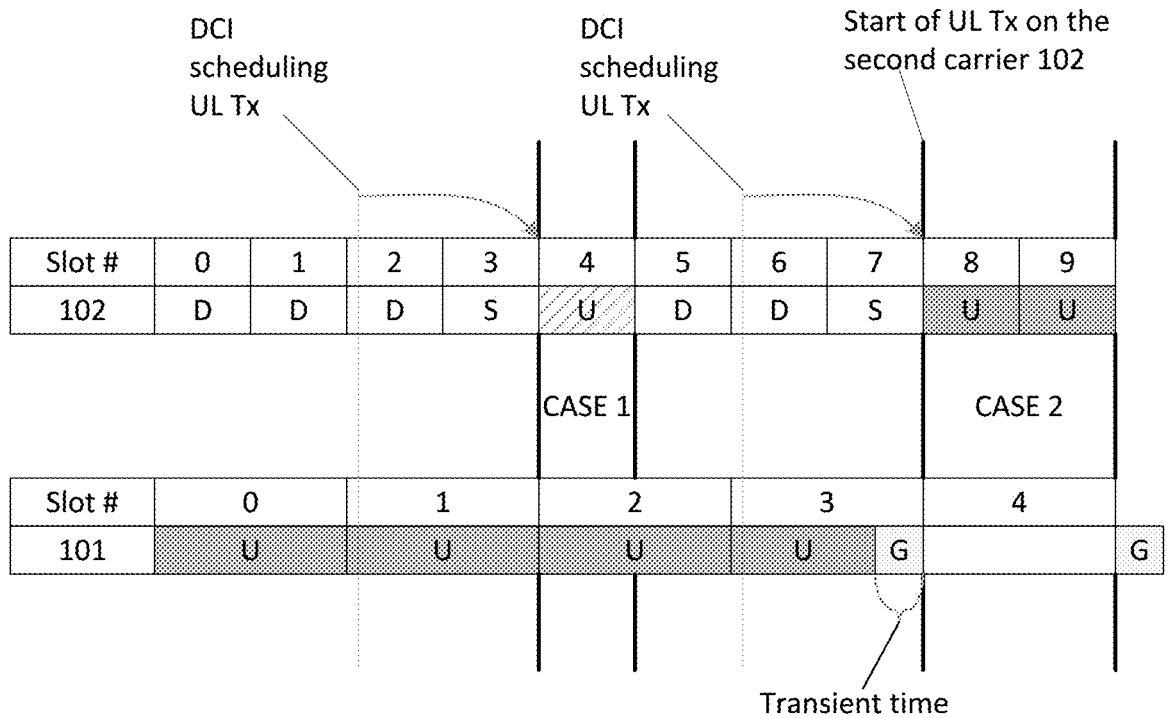
FIGS. 5A-5B (collectively, FIG. 5) are timing diagrams depicting a duration of, and a location of, a switching gap within which the UE may perform transmission chain/antenna switching, according to some embodiments of the present disclosure.
Figure 5B:
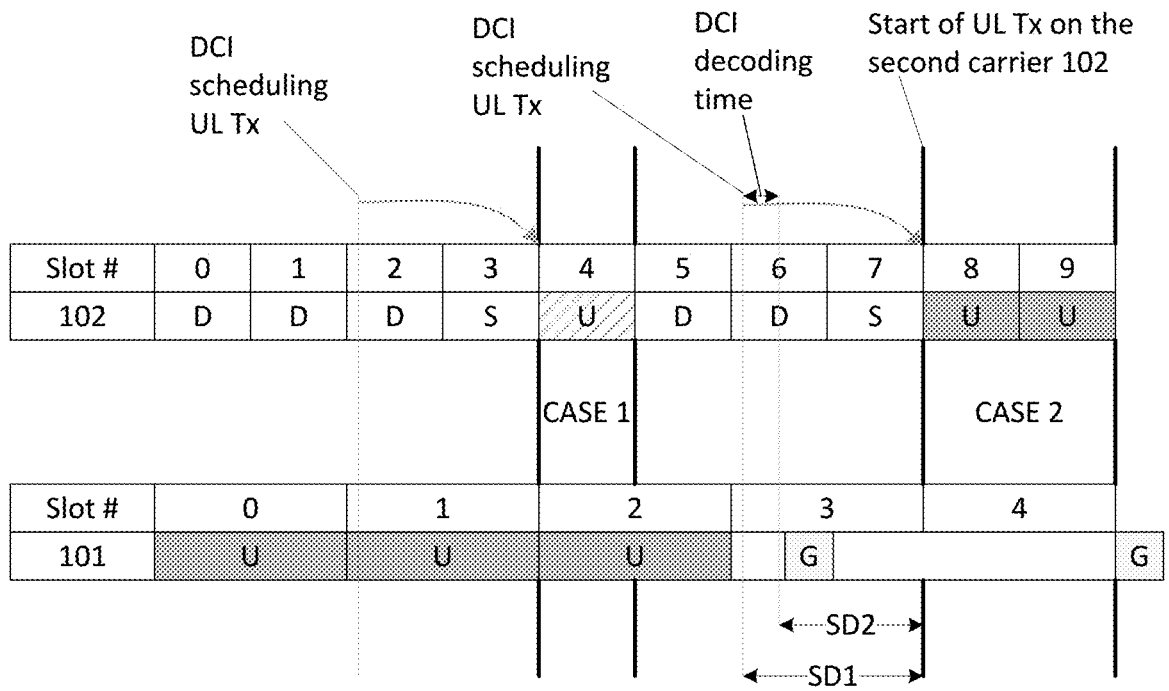

FIGS. 5A-5B (collectively, FIG. 5) are timing diagrams depicting a duration of, and a location of, a switching gap within which the UE may perform transmission chain/antenna switching, according to some embodiments of the present disclosure.

Because switching cannot happen instantaneously, some period of time must be provided to account for the amount of time it may take the UE 100 to switch Tx chains across carriers.

Referring to FIG. 5A, on the first carrier 101, time slots 0, 1, 2, and 3 may correspond to uplink slots U (for transmission from the UE 100). On the second carrier 102, time slots 0, 1, 2, 5, and 6 may correspond to downlink slots D (for reception by the UE 100). For example, one of the downlink slots D may carry information (e.g., downlink control information (DCI)) for scheduling an UL Tx. Furthermore, on the second carrier 102, time slots 3 and 7 may correspond to switching slots S (e.g., for switching from a downlink reception to an uplink transmission on the second carrier 102), while time slot 4 may correspond to a single Tx chain UL Tx, and while time slots 8 and 9 may correspond to a two Tx chain UL Tx.

In some embodiments, for the determination of an implicit switching location, the location may be determined to be at a boundary of the start of the newly implemented case following a switching operation (e.g., CASE 1 or CASE 2), as depicted in FIG. 5A. For example, the switching gap G may occur shortly before the start of CASE 2 (e.g., before the start of UL transmission on the second carrier 102 in slots 8 and 9). That is, the UE 100 may implicitly determine the location of the switching gap G, and may locate the switching gap G effectively immediately before the start of a given second carrier transmission Tx2 (e.g., the UL transmission on the second carrier 102), and may stop/interrupt transmission/reception on the first carrier 101 for the duration of the switching gap G, and also for the duration of the uplink transmission on the second carrier 102.

However, a switching gap G location that is explicitly fixed (e.g., rigidly defined) in such a manner may reduce flexibility of UE implementation and may create a burden.

For example, a UE may be configured to prepare for switching at a moment when it becomes aware of the suitability of switching. However, an explicitly fixed switching gap G location may delay the preparation of the UE, which may not be natural or efficient for the UE. Accordingly, an advantage of aspects of embodiments of the present disclosure is that the switching gap G location may be flexibly determined by, or based on, UE implementation within a possible switching duration (e.g., a switching duration), thus providing flexibility for switching gap G location, and reducing UE implementation complexity for Tx chain and antenna switching.

Referring to FIG. 5B, in some embodiments, a possible switching duration may be a duration (e.g. a period of time) between the downlink control information (DCI) scheduling of an UL Tx that is suitable for Tx chain switching (e.g., switching between CASE 1 and CASE 2), and the start of the corresponding UL transmission (e.g., on the second carrier 102). For example, the UE 100 may implicitly determine the switching gap G location based on UE implementation to be within a first switching duration SD1. The first switching duration SD1 may be useful because it may provide more flexibility and efficiency to the UE 100. For example, DCI decoding time may be UE specific and may be difficult to characterize. Thus, the switching gap G may be located within SD1 to provide freedom from such characterization.

Alternatively, the possible switching duration may be reduced by subtracting the DCI decoding time of the UE from the first switching duration SD1 above. That is, the UE 100 may implicitly determine the switching gap G location based on UE implementation to be within a second switching duration SD2. The first switching duration SD1 may be reduced because switching might not be initiated until the corresponding DCI is decoded. The second switching duration SD2 may be useful because a smaller duration may be more efficient in terms of system resource utilization (e.g., a UE may be unable to switch before finishing decoding). Thus, the switching gap G may be located within SD2 to reduce a resource waste that may be introduced by including such DCI decoding time in the switching duration.

Accordingly, the UE 100 may interrupt transmission/reception operations on one or more carriers (e.g., the first carrier 101) for the entire switching duration (e.g., SD1 or SD2), or any contiguous portion (e.g., any portion of time within SD1 or SD2) equal to the length of the switching gap G, by implementing the switching gap G within the switching duration.

FIG. 6 is a flowchart depicting a method of determining a location of a switching gap, according to some embodiments of the present disclosure.

Referring to FIG. 6, a method 600 may be performed wherein the UE 100 may determine (e.g., by using a processor and a memory): that a given UL transmission is suitable for switching a Tx chain across carriers (operation 610); a period of time between the DCI scheduling of the given UL transmission that is suitable for Tx chain switching and the start of the corresponding UL transmission (operation 620); a DCI decoding time (operation 630); a length of a switching gap G (operation 640); and whether a smaller switching duration is suitable (e.g., based on a determination that a more efficient use of resources is more suitable than freedom from a DCI decoding time characterization) (operation 650).

Based on the above determinations, the UE 100 may locate the switching gap G within the period of time between the DCI scheduling of the given UL transmission that is suitable for Tx chain switching and the start of the corresponding UL transmission (operation 660), or the UE 100 may locate the switching gap G within a period of time between the end of the DCI decoding time and the start of the corresponding UL transmission (operation 670).

Figure 7A:
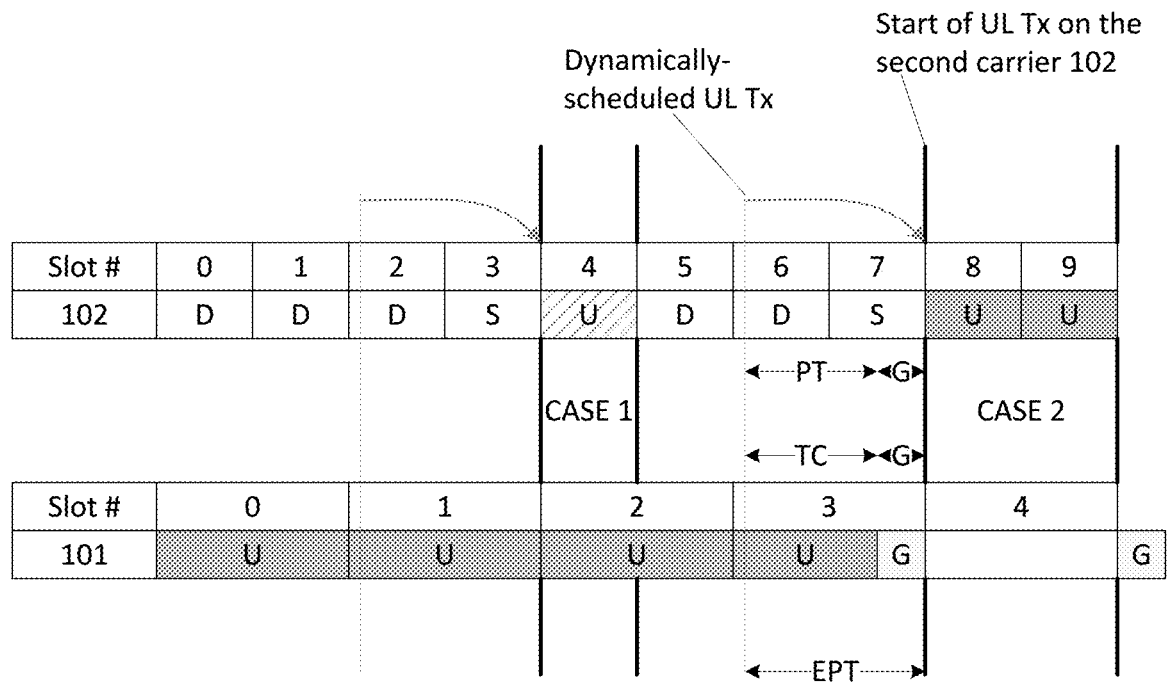
FIGS. 7A and 7B (collectively, FIG. 7) are timing diagrams depicting a duration and location of a switching gap corresponding to an extended preparation time, according to some embodiments of the present disclosure.
Figure 7B:
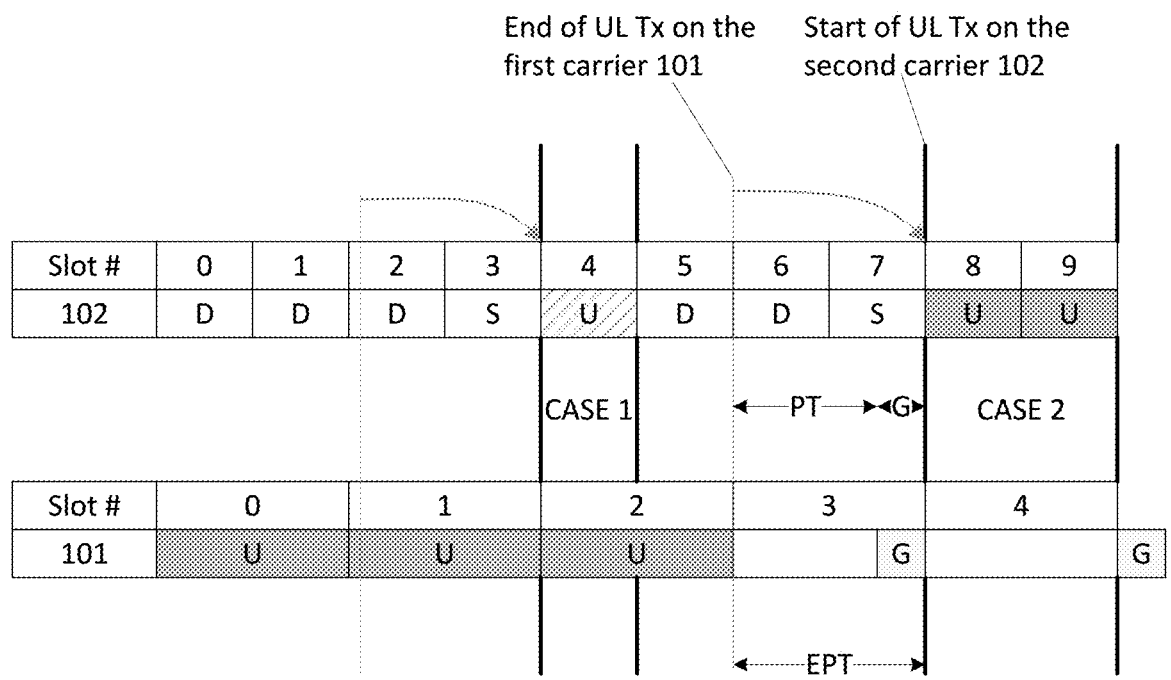

FIGS. 7A and 7B (collectively, FIG. 7) are timing diagrams depicting a duration and location of a switching gap corresponding to an extended preparation time, according to some embodiments of the present disclosure.

Referring to FIG. 7A, for dynamically scheduled UL transmission, to provide enough processing time for the UE 100 during switching (e.g., switching between CASE 1 and CASE 2), a preparation time PT (e.g., the amount of time between the scheduling of a given UL Tx and the start of the given UL Tx) for physical uplink shared channel (PUSCH) may be extended by a switching gap G (e.g., by the temporal length of the switching gap G).

In some embodiments, the switching gap G may be provided for other procedures (or operations). For example, a sounding reference signal (SRS) transmission (e.g., aperiodic SRS) with two Tx chains, and the associated preparation time PT (e.g., as described in 6.2.1 of the 3GPP specification 38.214) may be extended by the switching gap G. For example, an extended preparation time EPT (or total preparation time) between a dynamically-scheduled UL Tx that is suitable for Tx chain switching and the corresponding UL Tx may be determined and provided to correspond to the preparation time PT for PUSCH plus the time associated with the switching gap G.

In some embodiments, for dynamically scheduled UL transmission, uplink control information (UCI) may also be multiplexed to PUSCH (e.g., as described in 9.2.5 of 3GPP specification 38.213), which provides multiple timeline conditions (e.g., as shown in Table 2 below, which is the 3GPP specification describing the conditions that the first symbol S0 of a group of overlapping transmissions may be suited to satisfy, and in which the bullet points represent different conditions, where each equation T may be extended by G based on the present disclosure, as described below in the paragraphs following Table 2). Accordingly, when UCI multiplexing happens on PUSCH, some or all of the timeline conditions TC may be extended by the length of the switching gap G. For example, the extended preparation time EPT between a dynamically-scheduled UL Tx that is suitable for Tx chain switching and the corresponding UL Tx may be determined and provided to correspond to some or all of the respective timeline conditions TC plus the time associated with the switching gap G. Furthermore, the extended preparation time EPT may correspond to the possible switching duration (e.g., SD1 or SD2 of FIG. 5B).

TABLE 2

If one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies the following timeline conditions
- $S_0$ is not before a symbol with CP starting after $T_{proc,1}^{max} = (N_1 + d_{1,1} + 1) \cdot (2048 + 144) \cdot \kappa \cdot 2^{-\mu} \cdot T_C$ after a last symbol of any corresponding PDSCH, where μ corresponds to the smallest TABLE 2-continued SCS configuration among the SCS configuration of the PDCCH scheduling the PDSCH, the SCS configuration of the PDSCH, and the smallest SCS configuration for the group of overlapping PUCCHs and PUSCHs where the UE transmits HARQ-ACK information in response to the reception of the PDSCH
- $S_0$ is not before a symbol with CP starting after $T_{proc,release}^{max} = (N + 1) \cdot (2048 + 144) \cdot \kappa \cdot 2^{-\mu} \cdot T_C$ after a last symbol of any corresponding SPS PDSCH release, where N is described in Subclause 10.2 and µ corresponds to the smallest SCS configuration among the SCS configuration of the PDCCH providing the SPS PDSCH release and the smallest SCS configuration for the group of overlapping PUCCHs or overlapping PUCCHs and PUSCHs where the UE transmits HARQ-ACK information in response to the detection of the SPS PDSCH release
- if there is no aperiodic CSI report multiplexed in a PUSCH in the group of overlapping PUCCHs and PUSCHs, $S_0$ is not before a symbol with CP starting after
  $T_{proc,2}^{max} = \max((N_2 + d_{2,1} + 1) \cdot (2048 + 144) \cdot \kappa \cdot 2^{-\mu} \cdot T_C, d_{2,2})$ after a last symbol of
  - a PDCCH with the DCI format scheduling the PUSCH, and
  - any PDCCH scheduling a PDSCH or SPS PDSCH release with corresponding HARQ-ACK information in an overlapping PUCCH in the slot
  where µ corresponds to the smallest SCS configuration among the SCS configuration of the PDCCHs and the smallest SCS of the overlapping PUCCHs and PUSCHs, and
  $d_{2,1} = d_{2,2} = 0$ if there is no overlapping PUSCH
- if there is an aperiodic CSI report multiplexed in a PUSCH in the group of overlapping PUCCHs and PUSCHs, $S_0$ is not before a symbol with CP starting after
  $T_{proc,CSI}^{max} = \max((Z + d) \cdot (2048 + 144) \cdot \kappa \cdot 2^{-\mu} \cdot T_C, d_{2,2})$ after a last symbol of
  - a PDCCH with the DCI format scheduling the PUSCH, and
  - any PDCCH scheduling a PDSCH or SPS PDSCH release with corresponding HARQ-ACK information in an overlapping PUCCH in the slot
  where µ corresponds to the smallest SCS configuration among the SCS configuration of the PDCCHs, the smallest SCS configuration for the group of the overlapping PUCCHs and PUSCHs, and the smallest SCS configuration of aperiodic CSI-RS associated with the DCI format scheduling the PUSCH, and d = 2 for µ = 0, 1, d = 3 for µ = 2 and d = 4 for µ = 3
- $N_1$, $N_2$, $d_{1,1}$, $d_{2,1}$, $d_{2,2}$, and Z are defined in [6, TS 38.214], and κ and $T_C$ are defined in [4, TS 38.211].

For example, from Table 2, $T_{proc,2}^{max} = \max((N_2+d_{2,1}+1) \cdot (2048+144) \cdot \kappa \cdot 2^{-\mu} \cdot T_C, d_{2,2})$, which corresponds to the timeline condition TC for UCI multiplexing on PUSCH without channel status information (CSI), may be extended by the length of the switching gap G.

Similarly, from Table 2, $T_{proc,CSI}^{max} = \max((Z+d) \cdot (2048+144) \cdot \kappa \cdot 2^{-\mu} \cdot T_C, d_{2,2})$, which corresponds to a timeline condition TC for UCI multiplexing on PUSCH with CSI, may be extended by the length of the switching gap G.

Referring to FIG. 7B, for a configured grant PUSCH or semi-statically configured SRS, preparation time cannot be described between DCI and the corresponding transmission, as can be done in dynamic grant PUSCH, because such transmission types do not involve DCI. Accordingly, to ensure a sufficient amount of preparation time and switching time for configured grant PUSCH or semi-statically configured SRS, the amount of time (e.g., the possible switching duration) between the end of UL transmission before switching and the start of UL transmission after switching may be a preparation time PT plus switching gap G (e.g., the extended preparation time EPT).

Furthermore, the extended preparation time EPT may affect or alter a network scheduler (e.g., a global scheduler for scheduling both the first carrier 101 and the second carrier 102) and/or the design of the UE 100, as compared to a situation in which the preparation time PT or timeline conditions TC is not extended.

FIG. 8 is a flowchart depicting a method of determining a location of a switching gap and an extended preparation time, according to some embodiments of the present disclosure.

Referring to FIG. 8, a method 800 may be performed wherein the UE 100 may determine (e.g., by using a processor and a memory): that a given UL Tx is suitable for switching a Tx chain across carriers (operation 810); a switching gap G duration (operation 820); a preparation time or a timeline condition corresponding to the UL Tx (operation 830); and whether the UL Tx involves DCI (operation 840).

Based on the above, the UE 100 may extend the preparation time PT or the timeline condition TC between the DCI and the corresponding UL Tx by the switching gap G (operation 850), or the UE 100 may extend a preparation time between an end of an UL Tx on a carrier before switching and the start of a subsequent UL Tx by a switching gap G (operation 860). Thereafter, the Tx chain may be switched across carriers during the provided switching gap G (operation 870).

Figure 9A:
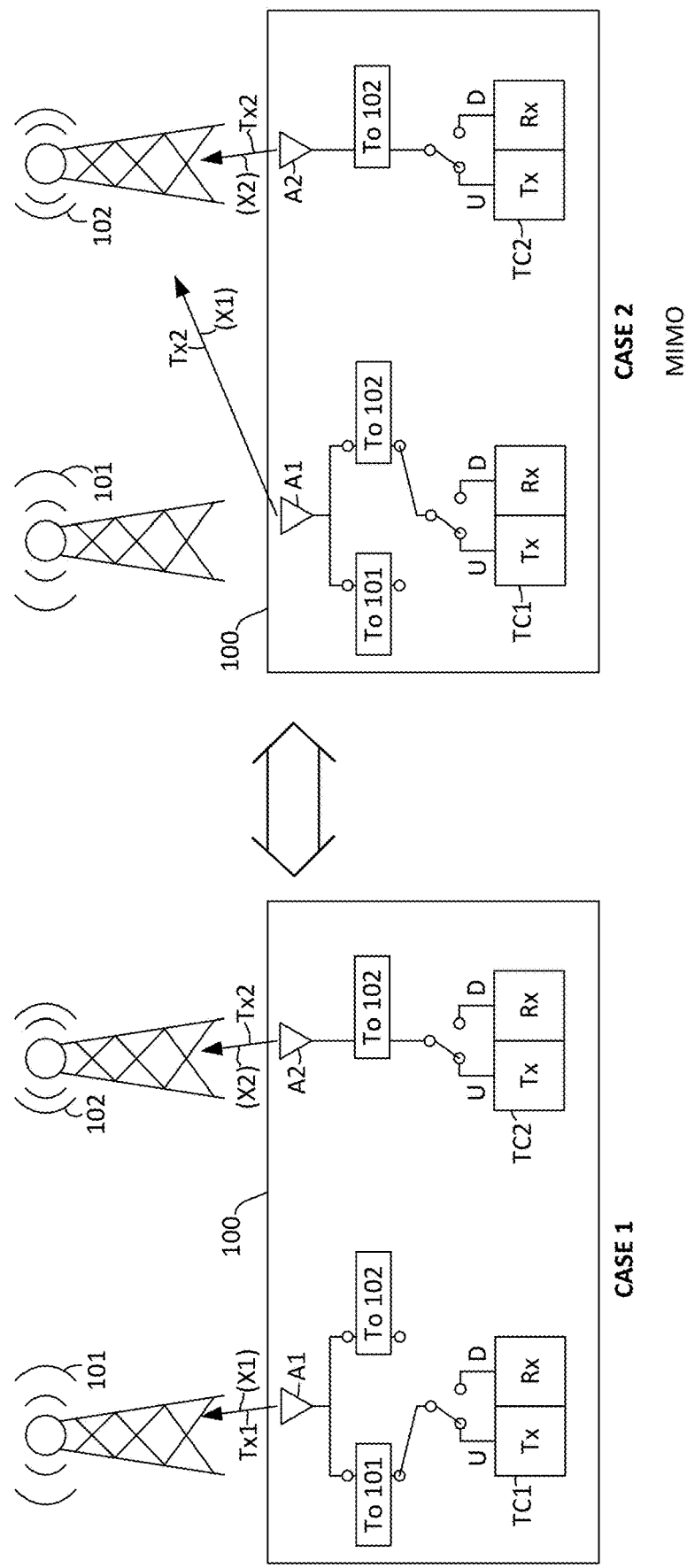
FIGS. 9A and 9B (collectively, FIG. 9) are simplified conceptual switching diagrams respectively depicting a MIMO switching scheme and a virtualization switching scheme, according to some embodiments of the present disclosure.
Figure 9B:
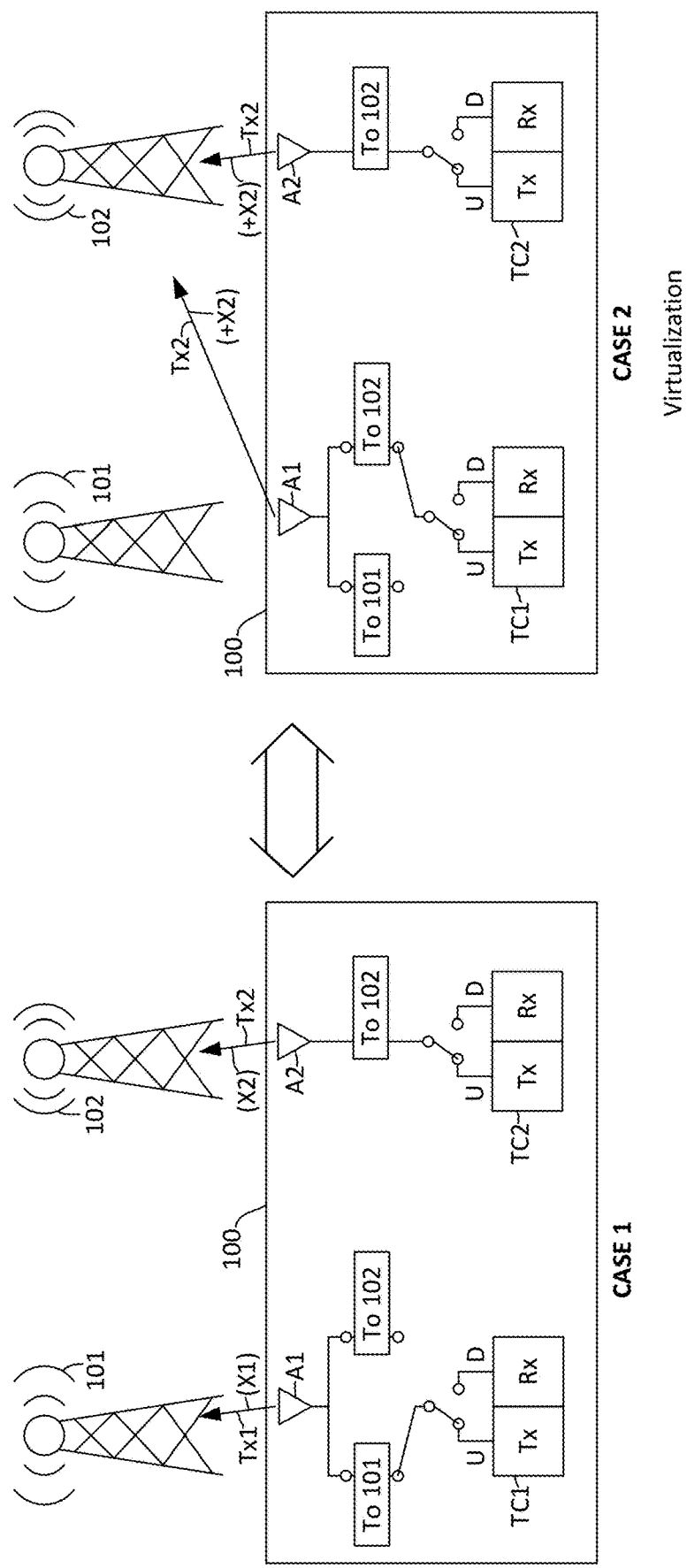

FIGS. 9A and 9B (collectively, FIG. 9) are simplified conceptual switching diagrams respectively depicting a MIMO switching scheme and a virtualization switching scheme, according to some embodiments of the present disclosure.

Referring to FIGS. 9A and 9B, and as discussed above, for implicit switching, a switching determination may be made based on a number of Tx chains for UL transmission on a particular carrier. For example, the UE 100 may implicitly determine that switching from CASE 1 to CASE 2 may happen based on a determination that two Tx chains are used on the second carrier 102.

Referring to FIG. 9A, in some embodiments, two Tx chains may be used for UL transmission on the second carrier 102 for MIMO transmission (e.g., traditional MIMO special multiplexing). For example, for CASE 2, the first Tx chain TC1 may be configured to transmit a first data X1 on the second carrier 102, and the second Tx chain TC2 may be configured to transmit a second data X2 on the second carrier 102.

Referring to FIG. 9B, in some embodiments, two Tx chains may be used for UL transmission on the second carrier 102 for virtualization (e.g., Tx virtualization or virtualized single-layer transmission). For example, for CASE 2, the second Tx chain TC2 may be configured to transmit a second data +X2, and the first Tx chain TC1 may also be configured to transmit the second data +X2 (e.g., the same data may be transmitted, but with different coefficients than with MIMO transmission), such that transmission of the second data +X2 may be more powerful than it would be with only one Tx chain. For example, two Tx chains may be virtualized by transmitting the same data because two physically separate Tx chains may be viewed as one Tx chain from a transmission viewpoint.

Figure 10A:
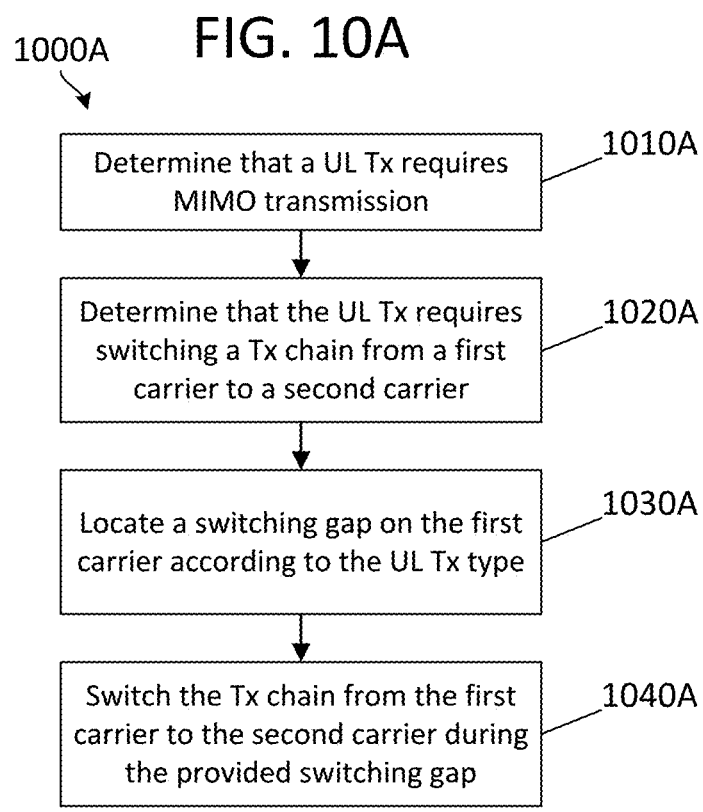

FIGS. 10A, 10B, and 10C (collectively, FIG. 10) are flowcharts depicting methods of determining that switching a transmission chain across carriers to use two transmission chains in one carrier is suitable, according to some embodiments of the present disclosure. The methods may be used based on MIMO transmission, based on virtualization, and based on scaling down a linear value of a transmission power instead of performing virtualization, respectively.

Referring to FIG. 10A, a method 1000A may be performed wherein the UE 100 may determine (e.g., by using a processor and a memory) that a given UL Tx uses MIMO transmission (operation 1010A), and may determine that the UL Tx is suitable for switching a Tx chain from the first carrier 101 to the second carrier 102 (operation 1020A). Based on these determinations, the UE 100 may locate a switching gap G on the first carrier 101 according to the UL Tx type (as discussed above) (operation 1030A), and may relocate the Tx chain from the first carrier 101 to the second carrier 102 during the provided switching gap G (1040A).

Furthermore, there are multiple different UL Tx channels and signals in the New Radio (NR) specification, including physical uplink control channel (PUCCH), PUSCH, physical random access channel (PRACH), and sounding reference signal (SRS). PUCCH and PRACH are considered to be one-port transmission. SRS and PUSCH can be one- or two-port transmission when a UE has up to two Tx chains. PUSCH can be scheduled by DCI format 0_0 and 0_1. PUSCH scheduled by format 0_0 is considered to be one-port transmission. In some embodiments, for those one-port transmissions, Tx virtualization may happen at a UE side in which multiple actual Tx chains are combined to simulate one port. Such virtualization may also happen for multi-port transmissions when a UE is equipped with more than two Tx chains.

In some embodiments, no virtualization may be applied for one-port transmissions. For example, (as will be discussed below) all one-port transmissions may be enabled to use only one Tx chain to have (e.g., to meet) a maximum level of transmission output power for the transmission without virtualization (e.g., because the current specification allows a non-full rated power amplifier (PA) at a UE side).

In some embodiments, when a UE needs to meet a certain maximum level of Tx output power that is suitable (e.g., about 23 decibels per milliwatt (dBm)), and when each Tx chain PA can only support up to a power that is less than the maximum level of Tx output power that is suitable (e.g., about 20 dBm), then the full power (e.g., about 23 dBm) may only be met when two Tx chains are used together. For example, the UE 100 may determine that two Tx chains are suitable in the second carrier 102 based on a determination that the second Tx chain TC2 is without full-rated power amplification (e.g., when the first Tx chain TC1 or the second Tx chain TC2 respectively provide a maximum output power that is less than a maximum level of Tx output power that is suitable for the network 120, such that virtualization is suitable for the UE 100 to have the maximum level of Tx output power).

For example, and referring to FIG. 10B, a method 1000B may be performed, wherein the UE 100 may determine (e.g., by using a processor and a memory): a maximum level of Tx output power that is suitable for a given UL Tx (operation 1010B); a maximum Tx chain output power (operation 1020B); that the maximum Tx chain output power is less than the maximum level of Tx output power that is suitable for the UL Tx (operation 1030B); and that the UL Tx is suitable for switching a first Tx chain TC1 from a first carrier 101 to a second carrier 102 (operation 1040B). Based on the above determinations, the UE 100 may: locate a switching gap G on the first carrier 101 according to the UL Tx type (as discussed above) (operation 1050B); and switch the first Tx chain TC1 from the first carrier 101 to the second carrier 102 during the provided switching gap G (operation 1060B).

On the other hand, in some cases, when there is full-rated power amplification, then one Tx chain may still meet full power. For example, the UE 100 may determine that only one Tx chain is suitable in the second carrier 102 based on a determination that the second Tx chain TC2 has full-rated power amplification (e.g., the second Tx chain TC2 provides a maximum output power that is equal to or greater than the maximum level of Tx output power that is suitable for the network 120).

In some embodiments, for a UE without a full-rated PA, where one-port transmission without virtualization may not sufficiently meet full power transmission, the UE operating a Tx switching scheme across carriers without virtualization may be allowed (e.g., enabled) to have maximum transmit power less than full power for one-port transmission (e.g., such that one transmission chain may be enabled to have the maximum level of transmission output power for the transmission without virtualization and, thus, a switching between carriers may be avoided or may be optional).

For example, a transmission may correspond to a transmission type for which a linear value of the maximum level of transmission output power for the transmission is capable of being scaled down. For example, when a PUSCH transmission scheduled by a DCI format 0_1 or configured by ConfiguredGrantConfig or semiPersistentOnPUSCH, if txConfig in PUSCH-Config is set to 'codebook', and when there is an SRS resource in the SRS-ResourceSet with usage set to 'codebook' that has more than one SRS port, or for PUCCH transmission or for PRACH transmission, the UE may scale (e.g., scale down) the linear value of transmission power of one-port transmission by the ratio of the number of antenna ports with a non-zero PUSCH transmission power to the maximum number of SRS ports supported by the UE in one SRS resource.

For example, the UE 100 may be configured to determine (A) a number of antenna ports with a non-zero PUSCH transmission power, and (B) a maximum number of SRS ports supported by the UE 100 in one SRS resource. Based on the above determinations, the UE 100 may be configured to scale down the linear value by the ratio of (A) to (B). For example, when the UE 100 needs to meet a maximum level of Tx output power of about 23 dBm, and when each Tx chain PA can only support up to about 20 dBm, the UE 100 may determine that the number of antenna ports with a non-zero PUSCH transmission power is 1 and that the maximum number of SRS ports supported by the UE 100 in one SRS resource is 2. Accordingly, the UE 100 may scale the linear value 23 dBm by 0.5, such that the first Tx chain TC1 and/or the second Tx chain TC2 are enabled to have (e.g., to meet) the maximum level of transmission output power for the transmission without virtualization (e.g., one transmission chain alone may be suited to have the maximum level of transmission output power for the transmission).

For example, and referring to FIG. 10C, a method 1000C may be performed, wherein the UE 100 may determine (e.g., by using a processor and a memory): a maximum level of Tx output power that is suitable for a given UL Tx (operation 1010C); a maximum Tx chain output power (operation 1020C); that the maximum Tx chain output power is less than the maximum level of Tx output power that is suitable for the UL Tx (operation 1030C); and that the UL Tx corresponds to a transmission type for which the maximum level of Tx output power is capable of being scaled down (e.g., reduced) (operation 1040C). Based on the above determinations, the UE 100 may: forgo virtualization and switching of the first Tx chain TC between the first carrier 101 and the second carrier 102 (operation 1050C); determine (A) a number of antenna ports with a non-zero PUSCH transmission power, and (B) a maximum number of SRS ports supported by a UE in one SRS resource (operation 1060C); and scale down the linear value of Tx power of one-port transmission by the ratio of A to B (operation 1070C).

Figure 11A:
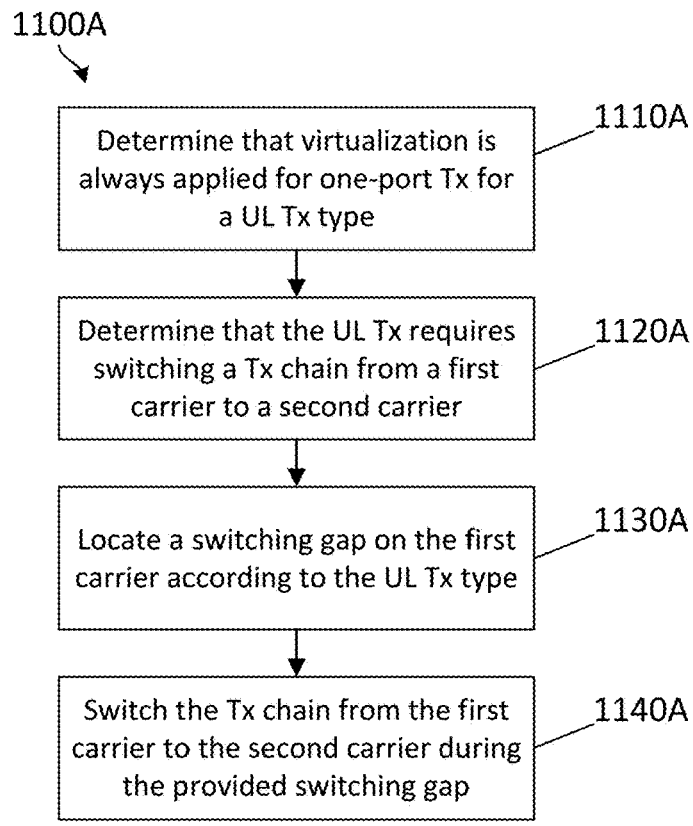
FIGS. 11A-11C (collectively, FIG. 11) are flowcharts depicting methods of determining that switching a transmission chain across carriers may be appropriate respectively based on virtualization being applied for a given transmission type, virtualization sometimes being applied for a given transmission type, and based on a network configuration for non-codebook based PUSCH, according to some embodiments of the present disclosure.
Figure 11B:
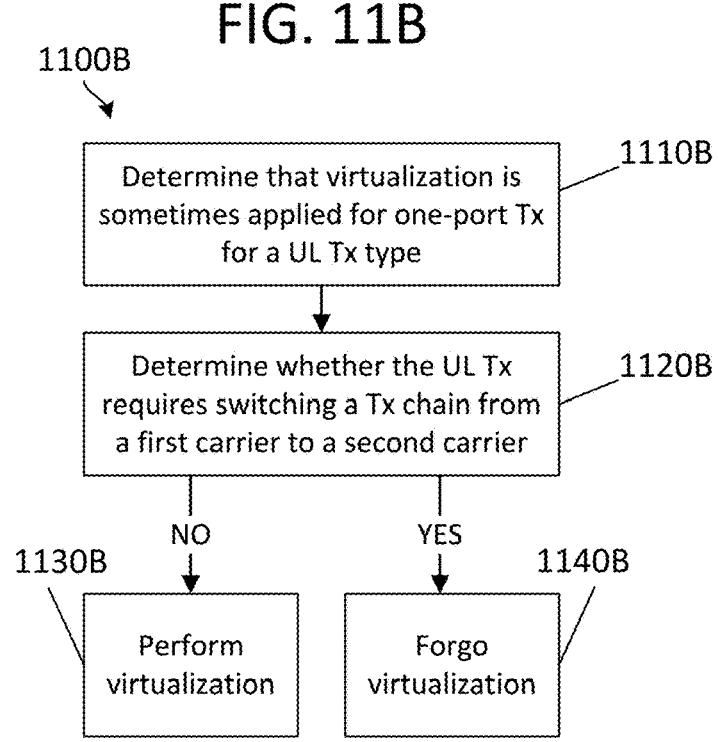
Figure 11C:
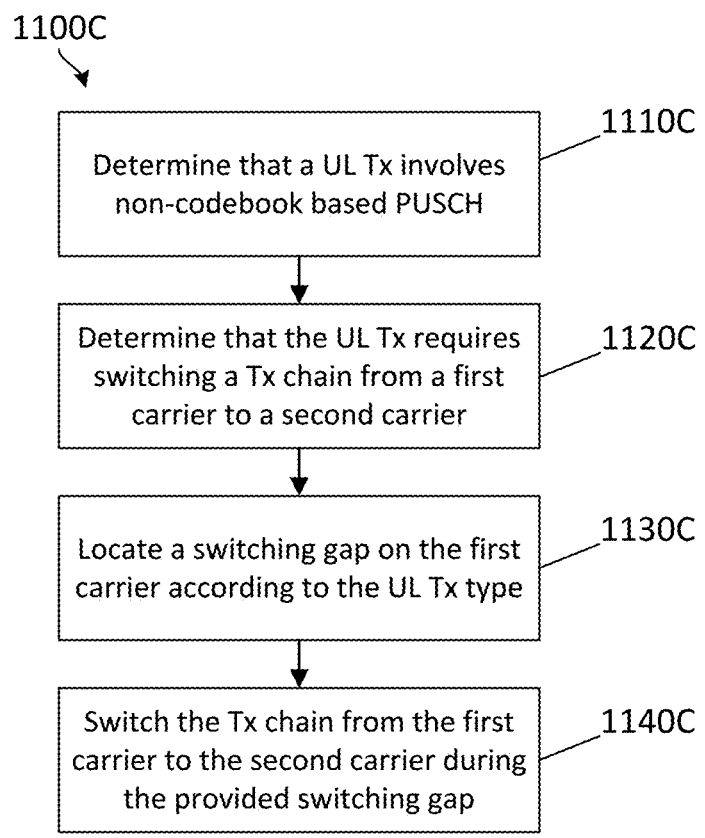

FIGS. 11A-11C (collectively, FIG. 11) are flowcharts depicting methods of determining that switching a transmission chain across carriers may be appropriate, according to some embodiments of the present disclosure. The methods may be respectively based on virtualization being applied for a given transmission type, based on virtualization sometimes being applied for a given transmission type, and based on a network configuration for non-codebook based PUSCH.

Another case to consider is when virtualization is applied for one-port transmissions. In this case, all one-port transmissions are suitable for two Tx chains. Accordingly, a switching gap G may be provided whenever an UL transmission happens on the second carrier 102 when the previous transmission occurred on the first carrier 101. In this case, preparation time for all one-port UL transmission may be extended by the switching gap G to provide enough processing time for the UE 100.

For example, for PUCCH corresponding to acknowledgement/negative acknowledgement (Ack/Nack) of physical downlink shared channel (PDSCH), a preparation time PT is provided by T_proc,1 in 3GPP specification 38.214; for semi persistent scheduling (SPS) release, a preparation time PT is described as N in 10.2 of 3GPP specification 38.213; and for CSI, a preparation time PT is described as Z in 3GPP specification 38.214.

In some embodiments, these preparation times PT may be extended by the switching gap G (see FIG. 7A). For example, the UE 100 may determine that switching from CASE 1 to CASE 2 is appropriate based on a type of UL transmission (e.g., PUCCH corresponding to Ack/Nack of PDSCH, SPS release, or CSI) when the UL transmission type is one where virtualization is applied for one-port transmissions. Thus, the UE 100 may cause a switching gap G to be applied to the first carrier 101 as an extension of the preparation time PT based on the given transmission type.

In some embodiments, for semi-statically configured transmissions for PUCCH, PUSCH, and SRS, the time amount between the end of UL transmission before switching and the start of UL transmission after switching may be a preparation time PT plus the switching gap G, because these transmission types do not involve DCI (see FIG. 7B). For example, the UE 100 may determine that switching from CASE 1 to CASE 2 is appropriate based on a type of transmission (e.g., semi-statically configured transmissions for PUCCH, PUSCH, or SRS) when the transmission type is one where virtualization is applied for one-port transmissions. Thus, the UE 100 may cause a switching gap to be applied to the first carrier 101 as an extension of the preparation time PT based on the given transmission type.

Referring to FIG. 11A, a method 1100A may be performed wherein the UE 100 may determine (e.g., by using a processor and a memory) that virtualization is applied for one-port transmission for a given UL Tx type (operation 1110A), and that the given UL Tx is suitable for switching the first Tx chain TC1 from the first carrier 101 to the second carrier 102 (operation 1120A). Based on the above determinations, the UE 100 may locate a switching gap G on the first carrier 101 according to the UL Tx type, as discussed above (operation 1130A), and may switch the Tx chain TC1 from the first carrier 101 to the second carrier 102 during the provided switching gap (operation 1140A).

Another case to consider is when virtualization is applied only sometimes, not always, for one-port transmission. In this case, the network 120 may configure the UE 100 to virtualize or not virtualize one-port transmission. Alternatively, virtualization may be applied implicitly (e.g., the UE 100 may implicitly determine to virtualize or not virtualize one-port transmission). For example, when a previous transmission corresponds to CASE 1 and one-port transmission is scheduled on the second carrier 102, then virtualization might not be applied (e.g., to avoid inefficient switching). On the other hand, when a previous transmission corresponds to CASE 2, and when one-port transmission is scheduled on the second carrier 102, then virtualization may be applied (e.g., because switching is not suitable for virtualization).

Accordingly, the nature of one-port transmission (e.g., whether the transmission is virtualized or not) may change depending on which case (e.g., CASE 1 or CASE 2) the UE 100 is in. Thus, in some embodiments, the wireless communication system 10 and/or the UE 100 may allow for variation of nature/characteristics over time for one-port transmission. For example, in some embodiments, the UE 100 may apply virtualization to a given one-port transmission that is scheduled on the second carrier 102 based on a determination that virtualization may be applied without switching the first Tx chain TC1 across carriers (e.g., the present switching configuration corresponds to CASE 2). Furthermore, in some embodiments, the UE 100 may determine not to apply virtualization (e.g., may forgo virtualization) to a given one-port transmission that is scheduled on the second carrier 102 based on a determination that virtualization may be applied only when the first Tx chain TC1 is switched across carriers (e.g., the present switching configuration corresponds to CASE 1).

Moreover, in some embodiments, the time amount between the end of UL transmission on one or more carriers before switching and the start of UL transmission on one or more carriers after switching may be determined to be the preparation time PT plus the switching gap G (e.g., because the PUSCH does not involve DCI and, thus, preparation time PT cannot be described between DCI and the corresponding PUSCH, as can be done in dynamic grant PUSCH).

Referring to FIG. 11B, a method 1100B may be performed wherein the UE 100 may determine (e.g., by using a processor and a memory) that virtualization is sometimes applied for one-port transmission for a given UL Tx type (operation 1110B), and may determine whether switching the first Tx chain TC1 from the first carrier 101 to the second carrier 102 is suitable for the given UL Tx (operation 1120B). Based on this determination, the UE 100 may perform virtualization (e.g., apply virtualization) (operation 1130B), or may forgo virtualization (e.g., not apply virtualization) (operation 1140B).

In 3GPP specification 38.214, non-codebook based PUSCH is described. For example, SRS configured with usage 'non-codebook' can have multiple one-port resources, which represent each layer of PUSCH transmission. The network indicates a combination of those resources to request a UE transmit PUSCH. Because some SRS resources may be virtualized without explicit indication, when one Tx chain for CASE 1 and two Tx chains for CASE 2 occur across time on the second carrier 102, some resources may be applicable only for a given case. In some embodiments, implicit/explicit indication of a subset of resources corresponding to each case may be considered. However, such an approach may increase the number of resources and, thus, increase signaling overhead because the resource set may cover virtualized and non-virtualized resources (e.g., at the same time).

Alternatively, in some embodiments, non-codebook based PUSCH may occur with either one Tx chain or two Tx chains in one carrier by network configuration. For example, the network 120 may have the UE 100 perform non-codebook based PUSCH transmission with one Tx chain, or the network 120 may have the UE 100 perform non-codebook based PUSCH transmission with two Tx chains. Accordingly, because covering both virtualized and non-virtualized resources at the same time may not be critical in typical deployments, an increase in signaling overhead may be avoided while providing flexibility to the network to choose to use virtualization or not.

Referring to FIG. 11C, a method 1100C may be performed wherein the UE 100 may determine (e.g., by using a processor and a memory) that a given UL Tx involves non-codebook based PUSCH (operation 1110C), and that the given UL Tx is suitable for switching the first Tx chain TC1 from the first carrier 101 to the second carrier 102 (operation 1120C). Based on the above determinations, the UE 100 may locate a switching gap G on the first carrier 101 according to the UL Tx type (as discussed above) (operation 1130C), and may switch the Tx chain TC1 from the first carrier 101 to the second carrier 102 during the provided switching gap G (operation 1140C).

Accordingly, embodiments of the present disclosure provide improvements to transmission chain/antenna carrier switching in communication systems involving multiple Tx chain transmission schemes, such as multi-input multi-output (MIMO), virtualization, and multi-carrier transmission.

While embodiments of the present disclosure have been particularly shown and described with reference to the embodiments described herein, it will be understood by those of ordinary skill in the art that various changes in form and details may be made therein without departing from the spirit and scope of the present invention as set forth in the following claims and their equivalents.

What is claimed is:

1. A method of switching, by a user equipment (UE), a transmission chain across carriers, the method comprising:
    determining to switch a first transmission chain for a transmission between a first carrier and a second carrier;
    determining a length of a switching gap during which no transmission or reception occurs on the first carrier and/or the second carrier;
    locating the switching gap within a switching duration that corresponds to an extended preparation time for switching the first transmission chain between the first carrier and the second carrier based on a transmission type of the transmission comprising a sounding reference signal (SRS) transmission or comprising an uplink control information (UCI) multiplexing on a physical uplink shared channel (PUSCH); and
    switching the first transmission chain between the first carrier and the second carrier during the switching gap.

2. The method of claim 1, further comprising:
    determining a preparation time or a timeline condition corresponding to the transmission type of the transmission comprising the SRS transmission or the UCI multiplexing on the PUSCH;
    determining the extended preparation time to be equal to or greater than the preparation time plus the length of the switching gap, or to be equal to or greater than the timeline condition plus the length of the switching gap; and
    switching the first transmission chain within the extended preparation time.

3. The method of claim 1, wherein the determining to switch the first transmission chain comprises:
    determining that a present switching configuration corresponds to a first case wherein the first transmission chain is located in the first carrier and a second transmission chain is located in the second carrier, and determining to use both the first transmission chain and the second transmission chain in the second carrier, or
    determining that the present switching configuration corresponds to a second case wherein both the first transmission chain and the second transmission chain are located in the second carrier, and determining to use the first carrier.

4. The method of claim 1, wherein the switching duration corresponds to a period of time between a downlink control information (DCI) scheduling of the transmission and a start of the transmission.

5. The method of claim 1, wherein the switching duration corresponds to a period of time between an end of a downlink control information (DCI) decoding time corresponding to a DCI scheduling of the transmission and a start of the transmission.

6. The method of claim 1, wherein the switching duration corresponds to a period of time between an end of a previous transmission and a start of the transmission.

7. The method of claim 3, wherein the determining to use the first carrier comprises determining to use a multi-carrier transmission.

8. The method of claim 3, wherein the determining to use both the first transmission chain and the second transmission chain in the second carrier comprises determining to use a multiple-input multiple-output (MIMO) transmission or virtualization.

9. The method of claim 3, wherein the determining to switch the first transmission chain between the first carrier and the second carrier further comprises:
    determining to use a non-codebook based physical uplink shared channel (PUSCH) using more than one transmission chain in one carrier, and determining that the present switching configuration corresponds to the first case, or
    determining to use a non-codebook based PUSCH using only one transmission chain in one carrier, and determining that the present switching configuration corresponds to the second case.

10. The method of claim 3, wherein the determining to switch the first transmission chain between the first carrier and the second carrier further comprises:
   determining that the transmission corresponds to a transmission type for which virtualization is applied only sometimes;
   determining that the present switching configuration corresponds to the first case; and
   forgoing both virtualization and switching from the first case to the second case.

11. The method of claim 3, wherein the determining to switch the first transmission chain between the first carrier and the second carrier further comprises:
   determining a maximum level of transmission output power for the transmission;
   determining a maximum transmission chain output power of the first transmission chain or the second transmission chain;
   determining that the maximum transmission chain output power of either the first transmission chain or the second transmission chain is less than the maximum level of transmission output power for the transmission;
   determining that the transmission corresponds to a transmission type for which a linear value of the maximum level of transmission output power for the transmission is capable of being scaled down;
   determining that the present switching configuration corresponds to the first case;
   forgoing both virtualization and switching from the first case to the second case; and
   scaling down the linear value of the maximum level of transmission output power for the transmission, such that the first transmission chain and/or the second transmission chain are enabled to have the maximum level of transmission output power for the transmission without virtualization.

12. The method of claim 8, wherein the determining to use virtualization comprises determining that virtualization is applied for a transmission type.

13. The method of claim 11, wherein the scaling down the linear value of the maximum level of transmission output power for the transmission comprises:
   determining a number of antenna ports with a non-zero PUSCH transmission power;
   determining a maximum number of SRS ports supported by a user equipment (UE) in one SRS resource; and
   scaling down the maximum level of transmission output power for the transmission by a ratio of the number of antenna ports with the non-zero PUSCH transmission power to the maximum number of SRS ports supported by the UE in one SRS resource.

14. A user equipment (UE) for performing a method of switching a transmission chain across carriers, wherein the UE is configured to:
   determine to switch a first transmission chain for a transmission between a first carrier and a second carrier;
   determine a length of a switching gap during which transmission and/or reception on the first carrier or the second carrier is interrupted;
   locate the switching gap on the first carrier or on the second carrier within a switching duration that corresponds to an extended preparation time for switching the first transmission chain between the first carrier and the second carrier based on a transmission type of the transmission comprising a sounding reference signal (SRS) transmission; and
   switch the first transmission chain between the first carrier and the second carrier during the switching gap.

15. The UE of claim 14, configured to:
   determine a preparation time corresponding to the transmission type of the transmission comprising the SRS transmission;
   determine the extended preparation time to be equal to or greater than the preparation time plus the length of the switching gap; and
   switch the first transmission chain within the extended preparation time.

16. The UE of claim 14, wherein the UE is configured to determine to switch the first transmission chain between the first carrier and the second carrier by:
   determining that a present switching configuration corresponds to a first case wherein the first transmission chain is located in the first carrier and a second transmission chain is located in the second carrier, and determining to use both the first transmission chain and the second transmission chain in the second carrier, or
   determining that the present switching configuration corresponds to a second case wherein both the first transmission chain and the second transmission chain are located in the second carrier, and determining to use the first carrier.

17. The UE of claim 14, wherein the switching duration corresponds to a period of time between an end of a downlink control information (DCI) decoding time corresponding to a DCI scheduling of the transmission and a start of the transmission, or a period of time between an end of a previous transmission and a start of the transmission.

18. A system for enabling a user equipment (UE) that is configured to switch a transmission chain across carriers to communicate within a network, the system comprising:
   the UE; and
   a base station that is communicatively coupled with the UE,
   wherein the UE is configured to perform a method of switching a transmission chain across carriers, the method comprising:
      determining to switch a first transmission chain for a transmission between a first carrier and a second carrier;
      determining a length of a switching gap during which no transmission or reception occurs on either the first carrier or the second carrier;
      locating the switching gap within a switching duration that corresponds to an extended preparation time for switching the first transmission chain between the first carrier and the second carrier based on a transmission type of the transmission comprising an uplink control information (UCI) multiplexing on a physical uplink shared channel (PUSCH); and
      switching the first transmission chain between the first carrier and the second carrier during the switching gap.

19. The system of claim 18, wherein the method further comprises:
   determining a timeline condition corresponding to the transmission type of the transmission comprising the UCI multiplexing on the PUSCH;
   determining the extended preparation time to be equal to or greater than the timeline condition plus the length of the switching gap; and
   switching the first transmission chain within the extended preparation time.

20. The system of claim 18, wherein the UE is configured to determine to switch the first transmission chain between the first carrier and the second carrier by:

determining that a present switching configuration corresponds to a first case wherein the first transmission chain is located in the first carrier and a second transmission chain is located in the second carrier, and determining to use both the first transmission chain and the second transmission chain in the second carrier, or determining that the present switching configuration corresponds to a second case wherein both the first transmission chain and the second transmission chain are located in the second carrier, and determining to use the first carrier.

\* \* \* \* \*